United States Patent [19]
Ichinose et al.

[11] Patent Number: 5,542,388
[45] Date of Patent: Aug. 6, 1996

[54] AIR-FLOW CONTROL DEVICE FOR ENGINE

[75] Inventors: Hiroki Ichinose, Fujinomiya; Shinji Sadakane, Susono; Keiso Takeda, Mishima; Susumu Kojima, Susono, all of Japan

[73] Assignee: Toyota Jidosha Kabushiki Kaisha, Toyota, Japan

[21] Appl. No.: 515,439

[22] Filed: Aug. 15, 1995

[30] Foreign Application Priority Data

Aug. 17, 1994 [JP] Japan ................................. 6-193121
Apr. 20, 1995 [JP] Japan ................................. 7-095562

[51] Int. Cl.⁶ ................................................ F02D 9/02
[52] U.S. Cl. .................. 123/336; 123/389; 123/179.18
[58] Field of Search .................. 123/179.18, 179.16, 123/442, 389, 336

[56] References Cited

U.S. PATENT DOCUMENTS

| | | | |
|---|---|---|---|
| 4,289,100 | 9/1981 | Kinugawa et al. | 123/179.18 |
| 4,693,222 | 9/1987 | Itou et al. | 123/179.18 |

FOREIGN PATENT DOCUMENTS

| | | |
|---|---|---|
| 61-19968 | 1/1986 | Japan . |
| 63-143349 | 6/1988 | Japan . |
| 1-119874 | 8/1989 | Japan . |
| 6-229353 | 8/1994 | Japan . |

*Primary Examiner*—Andrew M. Dolinar
*Attorney, Agent, or Firm*—Kenyon & Kenyon

[57] ABSTRACT

An air-flow control device, for an engine having an intake passage and a fuel injector arranged in the intake passage for injecting fuel into the intake passage, includes an air-flow control valve, and a driving apparatus for driving the air-flow control valve. The air-flow control valve is arranged in the intake passage upstream of the fuel injector. The apparatus includes a first vacuum chamber into which the atmospheric pressure or a negative pressure produced in the intake passage downstream of the air-flow control valve is selectively introduced via a first vacuum control valve, and a second vacuum chamber into which the atmospheric pressure or a negative pressure produced in the intake passage downstream of the air-flow control valve is selectively introduced via a second vacuum control valve. The apparatus drives the air-flow control valve so that the degree of opening of the air-flow control valve becomes larger as the negative pressure in the first and the second vacuum chamber becomes larger. During an engine starting operation, the air-flow control valve is closed by introducing the atmospheric pressure into both of the first and the second vacuum chambers. After the engine starting operation is finished, the air-flow control valve is opened and the degree of opening of the air-flow control valve is controlled by controlling the negative pressure in the first and the second vacuum chambers.

31 Claims, 16 Drawing Sheets

AIR-FLOW CONTROL DEVICE FOR ENGINE

BACKGROUND OF THE INVENTION

1. Field of the Invention

The present invention relates to an air-flow control device for an engine.

2. Description of the Related Art

Japanese Unexamined Patent Publication No, 63-143349 discloses an air-flow control device for an internal combustion engine having an intake passage and a fuel injector arranged in the intake passage for injecting fuel into the intake passage. The device includes an air-flow control valve arranged in the intake passage upstream of the fuel injector, and a driving apparatus for driving the air-flow control valve so as to close the air-flow control valve during an engine starting operation, and to open after the engine starting operation is finished.

In a typical engine having a throttle valve in the intake passage, when an engine starting operation is to be started, there exists a large amount of air in the intake passage downstream of the throttle valve, even if the throttle valve is substantially closed. In this condition, if the starting operation of the engine is started, this large amount of air is drawn into a combustion chamber of the engine, and thereby makes the air-fuel ratio in the combustion chamber extremely lean and causes improper combustion in the combustion chamber. As a result, a large amount of unburned HC could be exhausted into an exhaust passage of the engine. In particular, in an engine having a surge tank in the intake passage, a larger amount of air could be drawn into the combustion chamber at the starting operation of the engine, and thus, a larger amount of unburned HC could be exhausted into the exhaust passage. To solve this problem, in the air-flow control device mentioned above, the air-flow control valve is provided between the throttle valve and the fuel injector, and is made substantially closed to thereby prevent the combustion chamber from drawing a large amount of air during the engine starting operation. After the engine starting operation is finished, the air-flow control valve is made open so that a proper amount of air can be drawn into the combustion chamber.

In this connection, in the air-flow control device mentioned above, the driving apparatus for driving the air-flow control valve has a solenoid actuator that opens the valve when the engine starting operation completes. The solenoid actuator, however, complicates the construction of the driving apparatus and increases the cost thereof.

SUMMARY OF THE INVENTION

An object of the present invention is to provide an air-flow control device which can be made easily and at low cost.

According to the present invention, there is provided an air-flow control device for an engine having an intake passage and a fuel injector arranged in the intake passage for injecting fuel into the intake passage, the device comprising: an air-flow control valve arranged in the intake passage on the upstream of the fuel injector, the air-flow control valve being closed during an engine starting operation, and being open after the engine starting operation is finished; first and second vacuum sources; a driving apparatus for driving the air-flow control valve, the apparatus comprising: first and second vacuum chambers; a first vacuum control valve for selectively connecting the first vacuum chamber to either the first vacuum source or the atmosphere to introduce the negative pressure or the atmospheric pressure into the first vacuum chamber; and a second vacuum control valve for selectively connecting the second vacuum chamber to either the second vacuum source or the atmosphere to introduce the negative pressure or the atmospheric pressure into the second vacuum chamber, the apparatus driving the air-flow control valve so that a degree of opening thereof becomes larger as the negative pressure in the first and the second vacuum chamber becomes larger; and control means for controlling the apparatus so that each of the first and the second vacuum control valves introduce atmospheric pressure into the corresponding vacuum chamber to thereby ensure that the air-flow control valve is closed during an engine starting operation, and that the first and the second vacuum control valves control the negative pressures in the corresponding vacuum chamber to thereby keep the air-flow control valve open and to thereby control a degree of opening of the airflow control valve after the engine starting operation is finished.

The present invention may be more fully understood from the description of preferred embodiments of the invention set forth below, together with the accompanying drawings.

DESCRIPTION OF THE PREFERRED EMBODIMENTS

Figure 1:
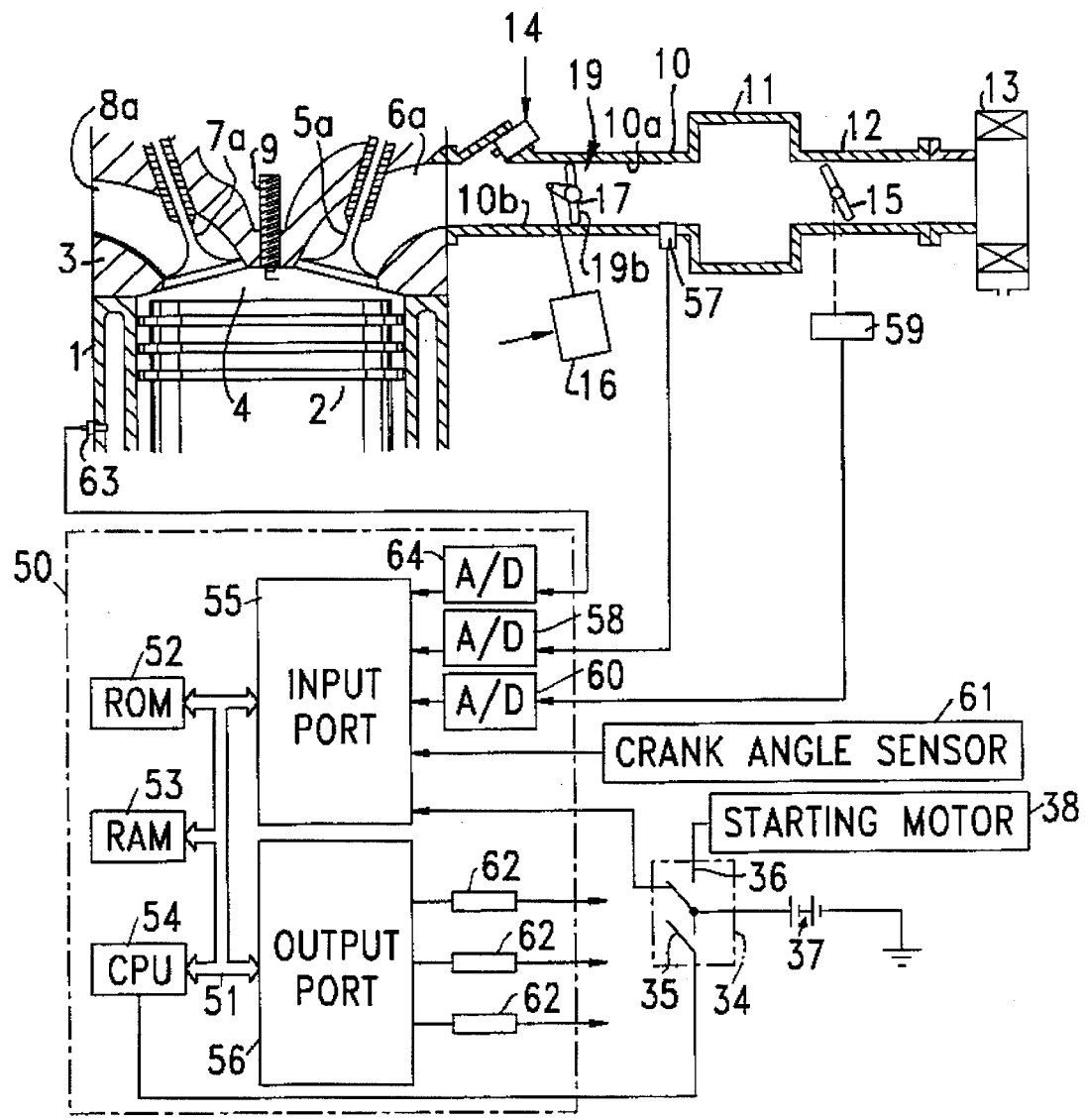
FIG. 1 is a general view of an engine.
Figure 2:
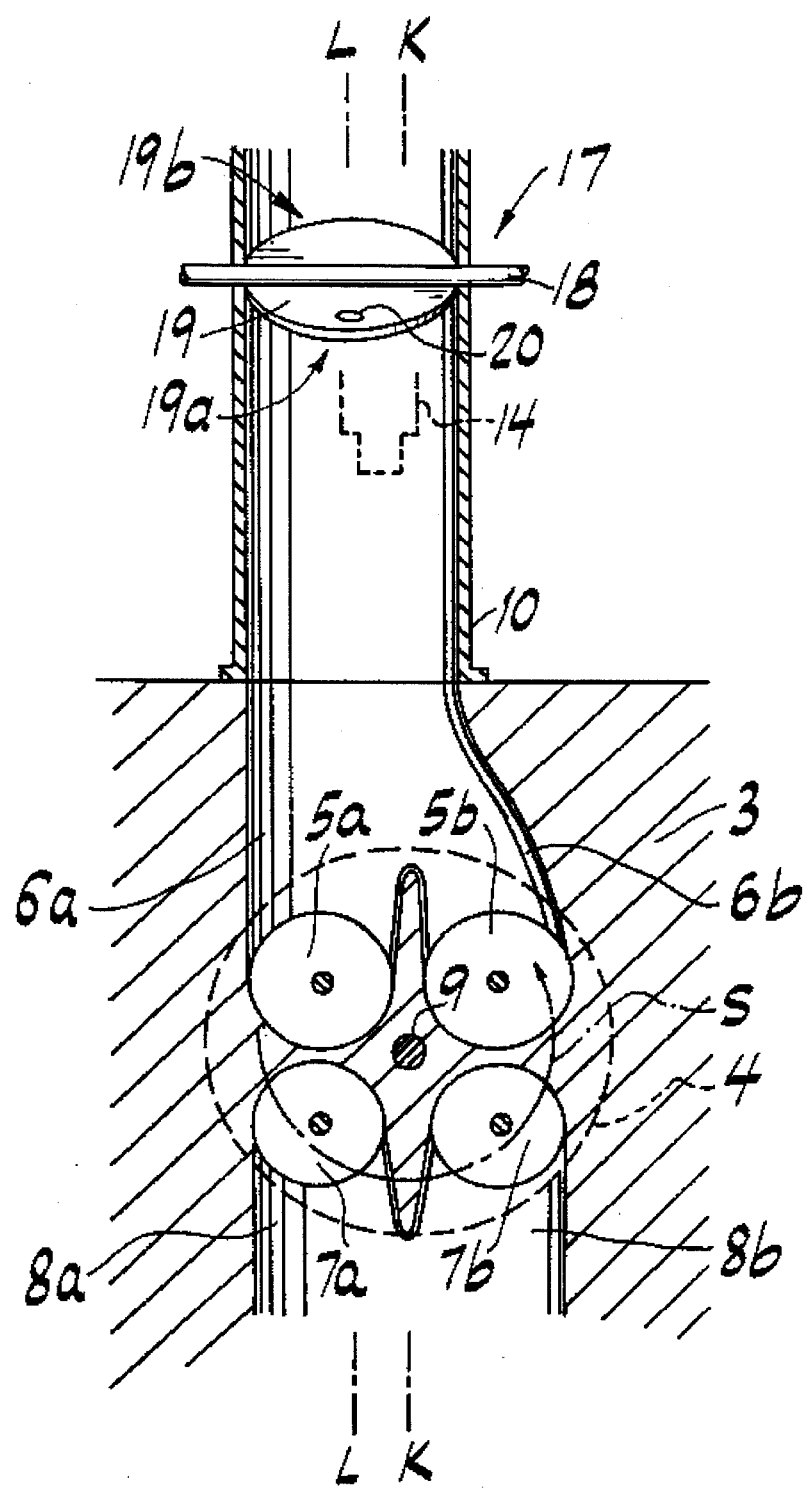
FIG. 2 is a cross-sectional view of a cylinder head.

Referring to FIGS. 1 and 2, reference numeral 1 designates a cylinder block, 2 designates a piston reciprocating in the cylinder block 1, 3 designates a cylinder head fixed to the top of the cylinder block 1, and 4 designates a combustion chamber defined between the top of the piston 2 and the cylinder head 3. Further, 5a designates a first intake valve arranged in a first intake port 6a, 5b designates a second intake valve arranged in a second intake port 6b, 7a designates a first exhaust valve arranged in a first exhaust port 8a, 7b designates a second exhaust valve arranged in a second exhaust port 8b, and 9 designates a spark plug arranged on an inner wall of the cylinder head 3. The intake ports 6a and 6b, formed in the cylinder head 3, are connected to a surge tank 11 for preventing air-flow pulsation, via a common branch 10. The surge tank 11 is connected to an intake duct 12, and the intake duct 12 is connected to an air cleaner 13. The exhaust ports 8a and 8b, formed in the cylinder head 3, are connected to a common exhaust manifold (not shown), which is connected to a catalytic converter (not shown.). In the branch 10, a fuel injector 14 is provided. Also, in the intake duct 12, a throttle valve 15 is arranged, the degree of opening TA of which is enlarged as a depression of an accelerator pedal (not shown) is made larger. The spark plug 9 and the fuel injector 14 are controlled by signals output from an electronic control unit 50

As shown in FIG. 2, in this embodiment, the intake valves 5a and 5b are symmetrically arranged with respect to a plane K—K that contains a cylinder axis. The exhaust valves 7a and 7b are also symmetrically arranged with respect to the plane K—K. The spark plug 9 is arranged on the plane K—K. An axis L—L of the branch 10 is eccentrically arranged with respect to the planed K—K in the side of the intake valve 5a. An axis of the intake port 6a is substantially in parallel with the axis L—L, and an axis of the intake port 6b forms an angle with the axis L—L.

An air-flow control valve 17 is arranged between the fuel injector 14 and the throttle valve 15 in the branch 10. The valve 17 is driven by a driving apparatus 16. In the embodiment shown in FIG. 1, the valve 17 is constructed as a butterfly valve having a shaft 18 and a disk 19 fixed to the shaft 18. The valve 17 may be constructed as a rotary valve. The shaft 18 is connected to the driving apparatus 16, and is arranged on the axis L—L. The disk 19 has an upper disk part 19a that is close to the fuel injector 14 with respect to the shaft 18, and a lower disk part 19b that is opposite to the upper disk part 19a with respect to the shaft 18. The upper disk part 19a has a small hole 20. The branch 10 has an upper wall part 10a and a lower wall part 10b. The fuel injector 14 is arranged on the upper wall part 10a. The lower wall part 10b is opposite to the upper wall part 10a with respect to the axis L—L.

When the air-flow control valve 17 is driven, the disk 19 is rotated around the shaft 18. The rotational direction of the valve 17 in this embodiment is selected as follows: when the valve 17 is made open, the upper disk part 19a, which is in contact with the upper wall part 10a when the valve 17 is closed, is moved toward the downstream of the air flow, and the lower disk part 19b, which is in contact with the lower wall part 10 b when the valve 17 is closed, is moved toward the upstream of the air flow. When the valve 17 is closed, the upper disk part 19a, which is in the downstream of the air flow, is moved toward the upper wall part 10a, and the lower disk part 19b, which is in the upstream of the air flow, is moved toward the lower wall part 10b. The rotational direction of the valve 17 may be selected opposite to that of this embodiment.

Referring to FIG. 1 again, a key switch 34 comprises an ignition switch 35 and a starting motor switch 36. The switch 36 is operable to ON only when the ignition switch 35 is ON. When the ignition switch 35 is turned ON, an electric power is supplied from a battery 37 to a CPU 54. When the starting motor switch 36 is turned ON, an electric power is supplied from the battery 37 to a starting motor 38, and thus the motor 38 is driven.

The electronic control unit 50 is constructed as a digital computer and comprises a read-only memory (ROM) 52, a random-access memory (RAM) 53, the CPU (micro processor) 54, an input port 55, and an output port 56. ROM 52, RAM 53, CPU 54, the input port 55, and the output port 56 are interconnected to each other via a bidirectional bus 51. A pressure sensor 57 is arranged in the branch 10 upstream from the air-flow control valve 17. The sensor 57 generates an output voltage in proportion to the pressure in the branch 10, and this output voltage is input to the input port 55 via an AD converter 58. According to the output signal of the AD converter 58, the CPU 54 calculates the amount of an air sucked into the engine. The throttle valve 15 is connected to a sensor 59, which generates an output voltage in proportion to the degree of opening TA of the throttle valve 15. The output voltage of the sensor 59 is output to the input port 55 via an AD converter 60. A water temperature sensor 63 generates an output voltage in proportion to the temperature of the cooling water of the engine. The output voltage of the sensor 63 is output to the input port D5 via an AD converter 64. The input port 55 is also connected to a crank angle sensor 61, which generates a pulse whenever a crankshaft is turned by, for example, 30 degrees. According to these pulses, the CPU 54 calculates the engine speed. Further, the input port 55 is input a signal representing whether the starting motor switch 36 is ON or OFF. The output port 56 is connected to the spark plug 9, the fuel injector 14, and the driving apparatus 16 via respective drive circuits 62.

The driving apparatus 16 for driving the air-flow control valve 17 will be explained.

Referring to FIG. 3, the driving apparatus 16 comprises first and second vacuum actuators 22 and 23 that are connected to the valve 17 through a common connection rod 21. This rod is movable in an axial direction thereof. The first actuator 22 has a first diaphragm 24 which defines a first vacuum chamber 25 and a first atmospheric chamber 26. The second actuator 53 has a second diaphragm 27 which defines a second vacuum chamber 28 and a second atmospheric chamber 29. The first vacuum chamber 25 is connected to the branch 10 downstream of the valve 17 through, in turn, a first vacuum control valve 30 and a check valve 31. The second vacuum chamber 28 is connected to the branch 10 downstream of the valve 17 through a second vacuum control valve 32. The check valve 31 allows a fluid to flow only from the first vacuum chamber 25 toward the branch 10. Namely, a negative pressure is transmitted only from the branch 10 toward the first vacuum chamber 25 through the check valve 31. The vacuum chambers 25 and 28 have compression springs 33 and 34, respectively, to sustain the shapes of the corresponding diaphragms 24 and 27 respectively. The atmospheric chambers 26 and 29 communicate with the atmosphere. The connection rod 21 is connected to both of the diaphragms 24 and 27.

The vacuum control valves 30 and 32 are controlled by signals output from the electronic control unit 50. The first vacuum control valve 30 communicates the first vacuum chamber 25 to the atmosphere when the power is supplied to it, i.e., when the valve 30 is turned ON, and communicates the first chamber 25 to the branch 10 when the power supply is stopped, i.e., when the valve 32 is turned OFF. The second vacuum control valve 32 communicates the second vacuum chamber 28 to the branch 10 when the valve 32 is turned ON, and communicates the second chamber 28 to the atmosphere when the valve 32 is turned OFF.

Next, a control of the air-flow control valve 17 will be explained.

Figure 3A:
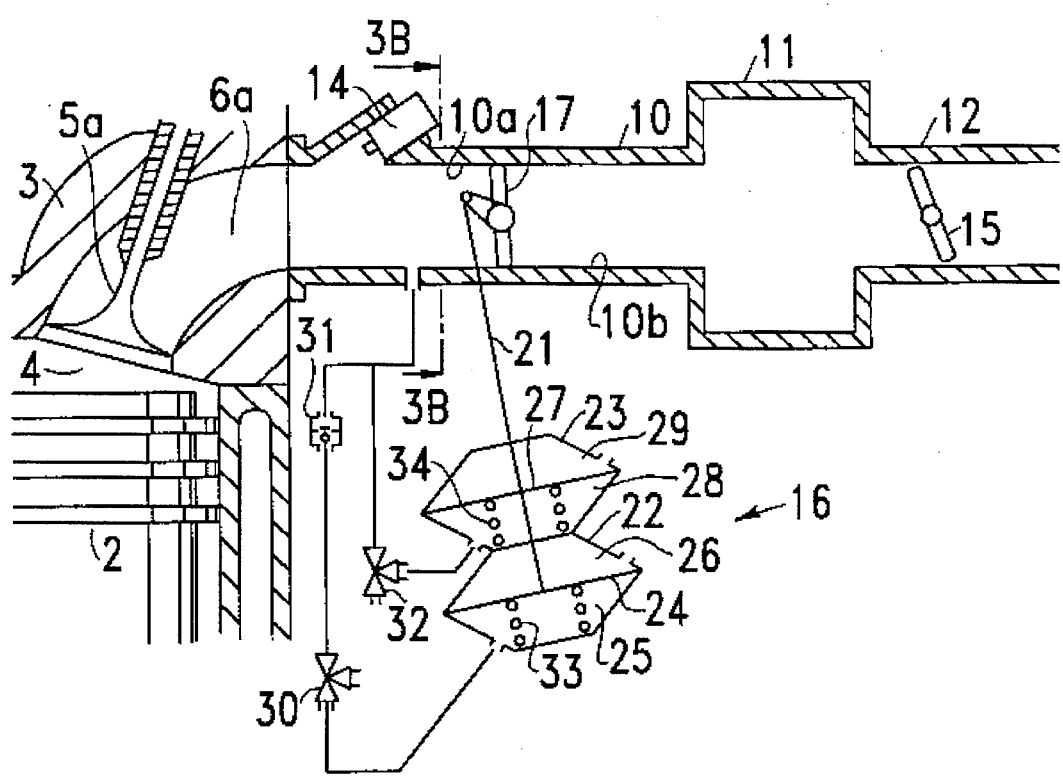
FIG. 3A is a partial view of the engine illustrating an air-flow control valve which is substantially closed.
Figure 3B:
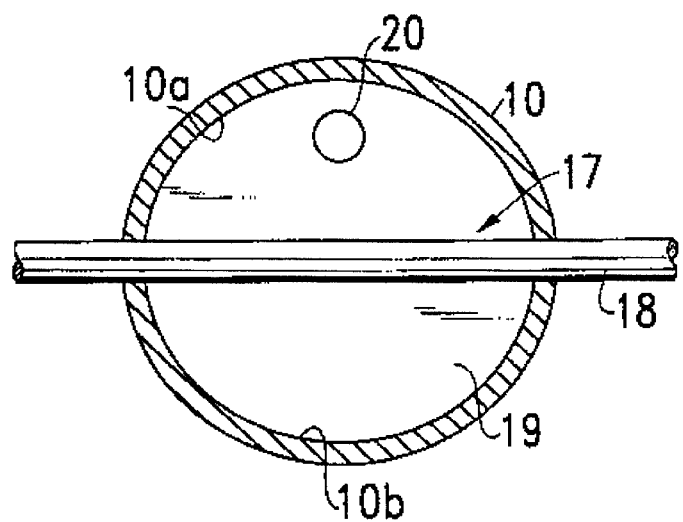
FIG. 3B is a cross-sectional view of the engine, taken along line 3B—3B in FIG. 3A.

During an engine starting operation, namely, during a period from the starting motor switch 36 is turned ON until the engine speed reaches a predetermined speed NO, for example, 400 rpm, the first vacuum control valve 30 communicates the first vacuum chamber 25 to the atmosphere, and the second vacuum control valve 32 communicates the second vacuum chamber 28 to the atmosphere. As a result, both of the diaphragms 24 and 27 do not deform, and thus the air-flow control valve 17 is kept closed, as shown in FIGS. 3A and 3B. Namely, the disk 19 of the valve 17 is in contact with the inner wall of the branch 10 along the periphery thereof, so that the upstream and downstream sides of the valve 17 communicate with each other only through the hole 20.

When the starting operation is started by the fact that the starting motor 38 is driven, the intake valves 5a and 5b are made open to draw air into the combustion chamber 4. In this condition, since the air-flow control valve 17 is closed, a limited amount of air is introduced into the combustion chamber 4. Namely, the air in a space between the intake valves 5a and 5b and the air-flow control valve 17, as well as the air passed through the hole 20 are drawn into the combustion chamber 4. In this way, the amount of air drawn into the combustion chamber 4 is limited at the engine starting operation. Also, the amount of fuel injected at the engine starting operation is reduced. Further, since the valve 17 is closed, a negative pressure produced in the branch 10 downstream of the valve 17 is made larger. This larger negative pressure promotes an atomization of the fuel injected, and thus an improve combustion in the combustion chamber 4 is ensured. This results in reducing the amount of unburned HC exhausted into the exhaust manifold at the engine starting operation. Further, when the valve 17 is close, the hole 20 is located in the vicinity of the upper wall part 10a. Therefore, the air passed through the hole 20 then collides with the fuel injected from the fuel injector 14, and thus, the further atomization of the fuel and the improve combustion are ensured. In this connection, FIG. 3B is a sectional view of the branch 10 taken along a line 3B—3B of FIG. 3A.

Figure 4A:
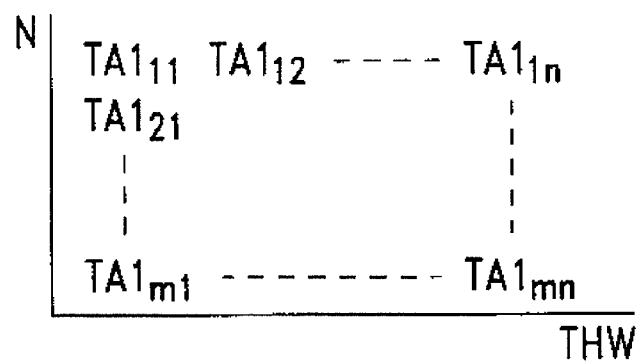
FIGS. 4A through 4C diagrams illustrating a predetermined degree of opening of throttle valve.
Figure 4B:
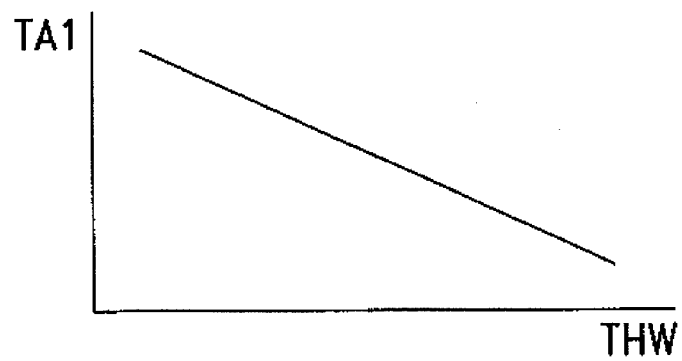
Figure 4C:
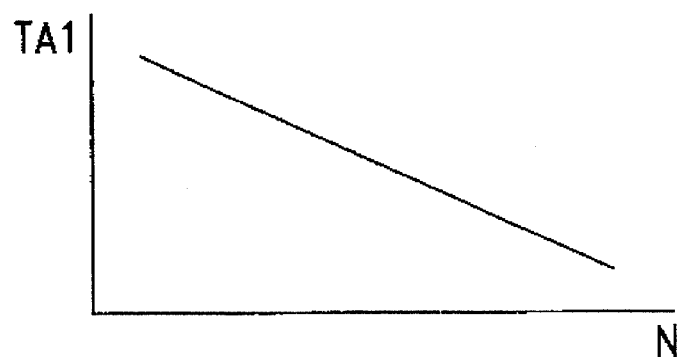

After the engine starting operation is finished, the driving apparatus 16 controls the air-flow control valve 17 to either an intermediate position or a full-open position depending on an engine operating condition, such as an engine load. When the engine is operating under a light load, i.e., when the degree of opening TA of the throttle valve 15 is smaller than a reference degree of opening TA1, the valve 17 is controlled to the intermediate position, which is between the close position and the full-open position. When the engine is operating under a high load, i.e., when the degree of opening TA is greater than the reference degree TA1, the valve 17 is controlled to the full-open position. The reference degree of opening TA1 for the throttle valve 15 is predetermined as a function of the temperature of engine cooling water THW and the engine speed N, and is stored in the ROM 52 in a form of a map as shown in FIG. 4A. When the engine speed N is fixed as shown in FIG. 4B, the reference degree TA1 becomes smaller as the water temperature THW increases. When the water temperature THW is fixed as shown in FIG. 4C, the reference degree TA1 becomes smaller as the engine speed N increases. In this way, since the valve 17 is made open after the engine starting operation is completed, an ample amount of air is drawn into the combustion chamber 4. In this connection, the degree of opening of the valve 17 is larger than that of the throttle valve 15 after the engine starting operation is completed.

Figure 5A:
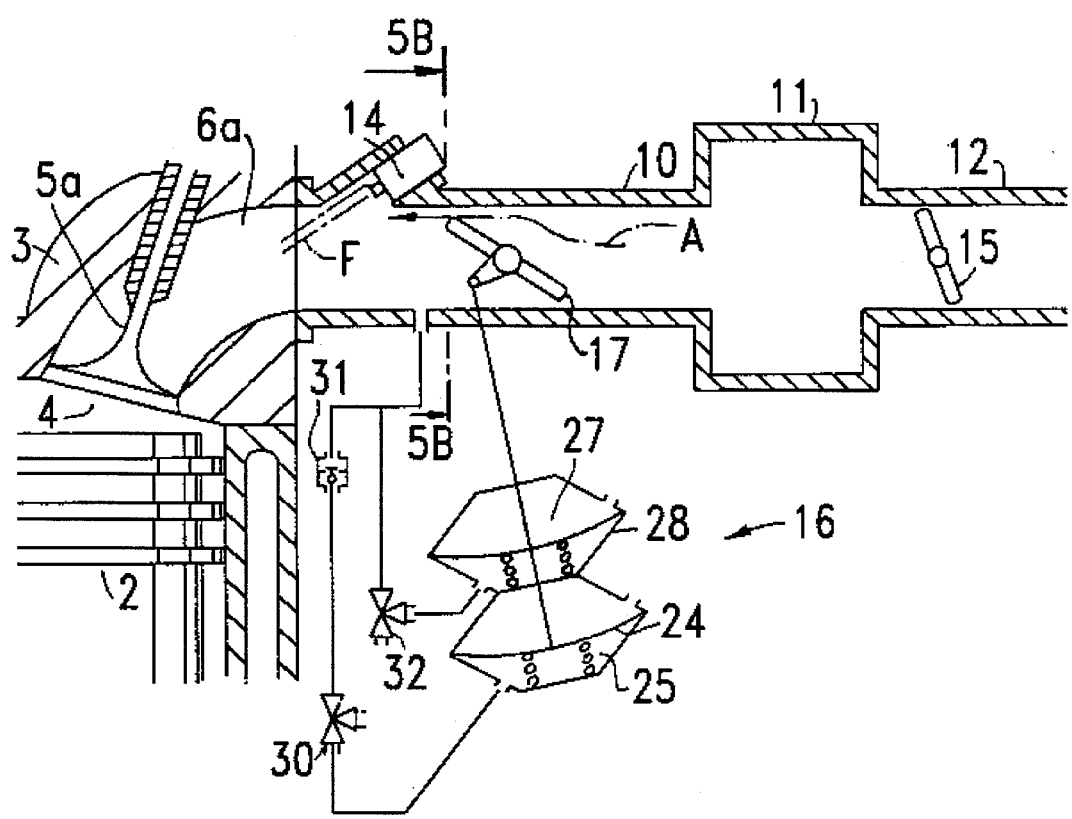
FIG. 5A is a partial view of the engine illustrating an air-flow control valve which is made partially open.
Figure 5B:
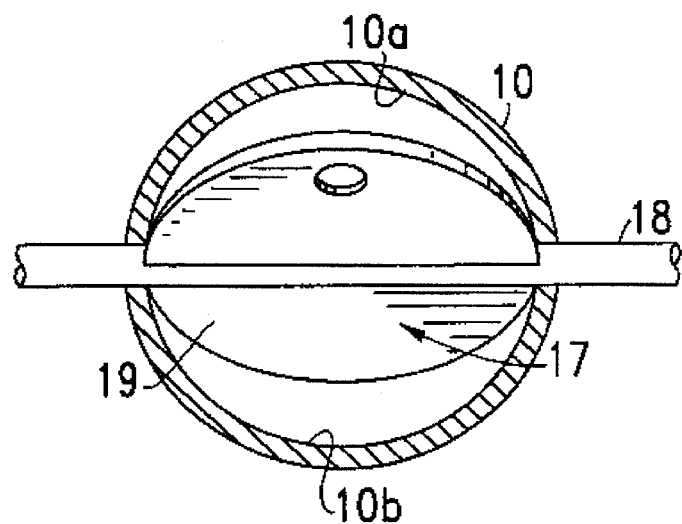
FIG. 5B is a cross-sectional view of the engine, taken along line 5B—5B in FIG. 5A.

When the engine is operating under a light load wherein the degree of opening TA of the throttle valve 15 is smaller than the reference degree of opening TA1, the first vacuum control valve 30 communicates the first vacuum chamber 25 to the branch 10, and the second vacuum control valve 32 communicates the second vacuum chamber 28 to the atmosphere. Just before the engine starting operation completes, a negative pressure sufficient to open the air-flow control valve 17 is produced in the branch 10 downstream of the valve 17. Therefore, when the first vacuum control valve 30 communicates the first vacuum chamber 25 to the branch 10, this negative pressure is introduced into the first vacuum chamber 25. On the other hand, at this time, the second vacuum chamber 28 is kept connected to the atmosphere. As a result, the diaphragms 24 and 27 are slightly deformed and thereby the rod 21 is moved downwardly in FIG. 5A. Accordingly, the valve 17 is moved to intermediate position, as shown in FIGS. 5A and 5B. In this embodiment, when the valve 17 is at an intermediate position, the degree of opening of the valve 17 is about half of that at the full-open position. Namely, the intermediate position is the half-open position, in this embodiment.

When the position of the air-flow control valve 17 is changed from the closed position to the half-open position, the upper disk part 19a of the valve 17 is moved toward the downstream of the air flow. When the valve 17 is at the half-open position, the air flowing toward the valve 17 then flows along a surface of the disk 19. As a result, almost all of the air passes through a gap formed between the disk 19 and the upper wall part 10a, as indicated with an arrow A in FIG. 5A. In this connection, an intake synchronous fuel injection, in which the fuel injector 14 injects fuel during an intake stroke of the engine, is carried out when the valve 17 is at the half-open position. Accordingly, the air A passed through the gap between the disk 19 and the upper wall part 10a advances along the upper wall part 10a and then collides the injected fuel F, so that further atomization of the fuel F is carried out. This results in improving combustion in the combustion chamber 4.

Figure 6:
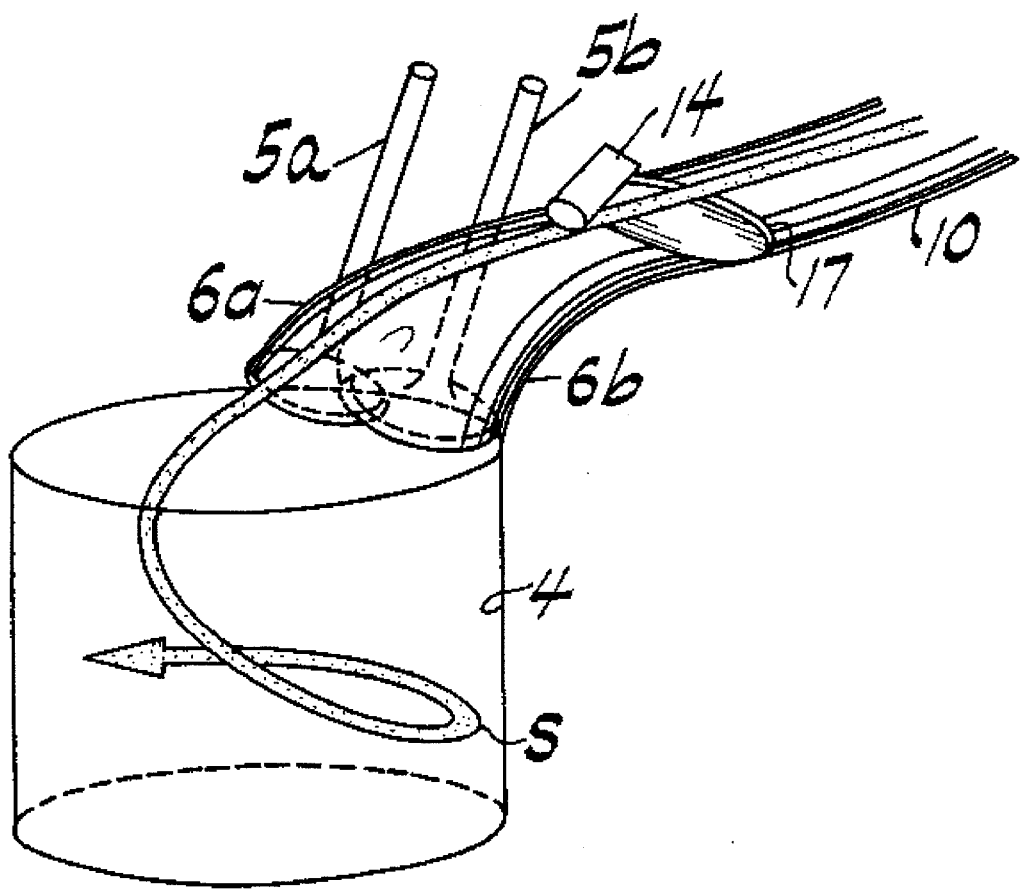
FIG. 6 is a perspective view of the engine which schematically illustrates the gas flow in the combustion chamber.

Next, air A and fuel F together enter the intake ports 6a and 6b. As shown in FIG. 2, the axis of the intake port 6a is substantially in parallel with the axis of the branch 10. Accordingly, when the air-flow control valve 17 is at the half-open position, almost all of the air A entering the intake port 6a flows through the intake valve 5a into the combustion chamber 4. The air A then flows along the peripheral wall of the combustion chamber 4, and thus forms a swirl S, as shown in FIG. 2. Further, almost all of the air flowing along the upper wall part 10a into the intake port 6a enters the combustion chamber 4 through an opening between the intake valve 5a and the cylinder head 3 in the vicinities of the exhaust valves 7a and 7b. Then, the air descends along the inner wall of the combustion chamber 4 under the exhaust valves 7a and 7b. Therefore, a swirl S as shown in FIG. 6 is formed in the combustion chamber 4. This results in further improving combustion in the combustion chamber 4.

A negative pressure produced in the branch 10 between the air-flow control valve 17 and the intake ports 6a and 6b when the valve 17 is at the half-open position is larger than that produced when the valve 17 is at the full-open position. This promotes evaporation of fuel attached to the walls of the intake ports 6a and 6b, and thus it is prevented that the amount of fuel supplied to the engine is changed from a desired amount.

During an overlap period wherein both of the intake valves 5a and 5b and the exhaust valves 7a and 7b are open, a burned gas or an air-fuel mixture in the combustion chamber 4 is blown back into the intake ports 6a and 6b through the intake valves 5a and 5b. In this embodiment, however, such a blown-back gas can be reduced, when the air-flow control valve 17 is at half-open position. As a result, injected fuel will not flow back by the blown-back gas, and thus it is prevented that the amount of fuel supplied to the engine is changed from a desired amount.

Figure 7A:
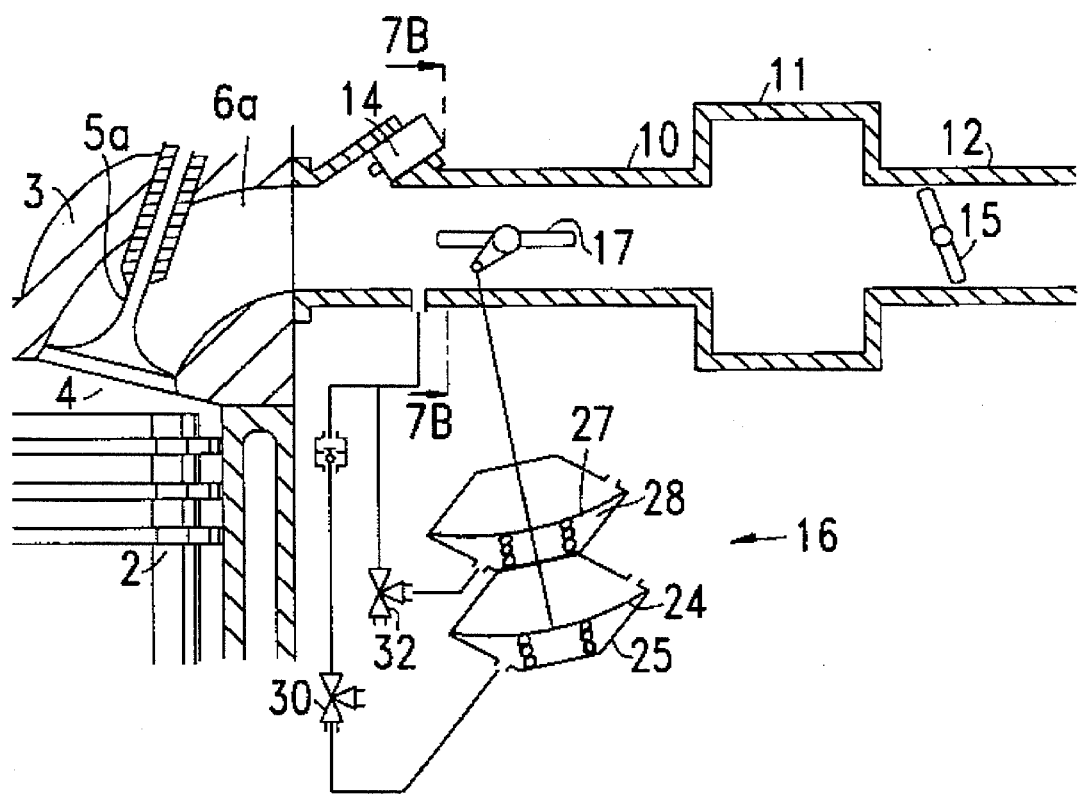
FIG. 7A is a partial view of the engine illustrating an air-flow control valve which is made fully open.
Figure 7B:
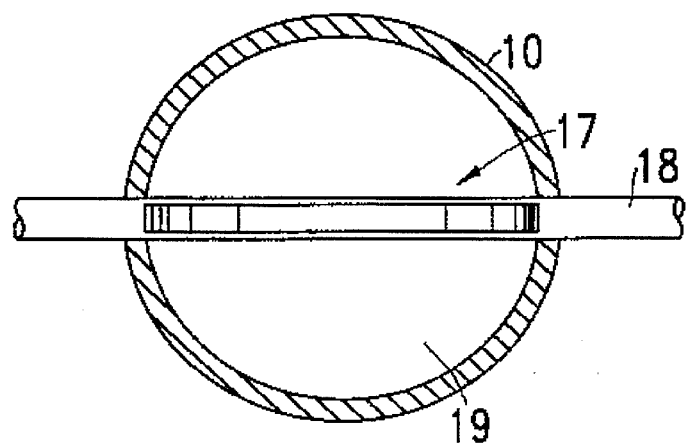
FIG. 7B is a cross-sectional view of the engine, taken along line 7B—7B in FIG. 7A.

On the other hand, when the engine is operating under the high load wherein the degree of opening TA of the throttle valve 15 is larger than the reference degree of opening TA1, the first vacuum control valve 30 communicates the first vacuum chamber 25 to the branch 10, and the second vacuum control valve 32 communicates the second vacuum chamber 28 to the branch 10. As a result, a negative pressure in the branch 10 is introduced into both of the vacuum chambers 25 and 28, and thereby the diaphragms 24 and 27 are further deformed. Accordingly, the rod 21 is moved downwardly in FIG. 7A, and thus the air-flow control valve 17 is brought to and maintained at the full-open position, as shown in FIGS. 7A and 7B. While the valve 17 is maintained at the full-open position, no shortage of air to be drawn into the combustion chamber 4 will occur, even when the engine load is high wherein a large amount of air is required. In this connection, FIG. 7B is a sectional view showing the branch 10 taken along a line 7B—7B of FIG. 7A.

When the air-flow control valve 17 is at the full-open position, an intake asynchronous fuel injection, in which the fuel injection is stopped before an intake stroke of the engine is started, is carried out. Namely, in the asynchronous fuel injection, a fuel injection is carried out during a compression stroke of the engine. If the intake synchronous fuel injection is carried out so that fuel injected is supplied directly into the combustion chamber 4 when the valve 17 is at the full-open position, it is difficult to form an uniform air fuel mixture in the combustion chamber 4. On the other hand, if the intake asynchronous fuel injection is carried out when the valve 17 is at the full-open position, fuel collides the walls of the intake ports 6a and 6b and the backs of the heads of the intake valves 5a and 5b, and thus is atomized. Also, the fuel attached to these parts is atomized by the blown-back gas and then is drawn into the combustion chamber 4. Thereby, an uniform air-fuel mixture is formed in the combustion chamber 4. This secures proper combustion- On the other hand, when the valve 17 is at the half-open position, fuel is properly atomized, as mentioned above. Therefore, an uniform air-fuel mixture is formed in the combustion chamber 4 even if the intake synchronous fuel injection is carried out, when the valve 17 is at the half-position. Further, in this embodiment, power supply to the vacuum control valves 30 and 32 is stopped when the engine is stopped. As a result, the first vacuum control valve 30 communicates the first vacuum chamber 25 to the branch 10, and the second vacuum control valve 32 communicates the second vacuum chamber 28 to the atmosphere. While no negative pressure is produced in the branch 10 when the engine is stopped, the check valve 31 is provided between the first vacuum chamber 25 and the branch 10. This check valve 31 prevents the negative pressure in the first vacuum chamber 25 from leaking therefrom, and thereby the negative pressure in the first vacuum chamber 25 maintains the valve 17 at the half-open position, as shown in FIGS. 5A and 5B. After the engine is stopped, water may condense on the inner wall of the branch 10. If the valve 17 is kept closed when the engine is stopped, the condensed water may adhere to the valve 17. If this water freezes, the valve 17 will be fixed to the inner wall of the branch 10. To solve this icing problem, in this embodiment, the negative pressure is maintained in the first vacuum chamber 25 when the engine is stopped, so as to keep the valve 17 open and to prevent icing.

Figure 8:
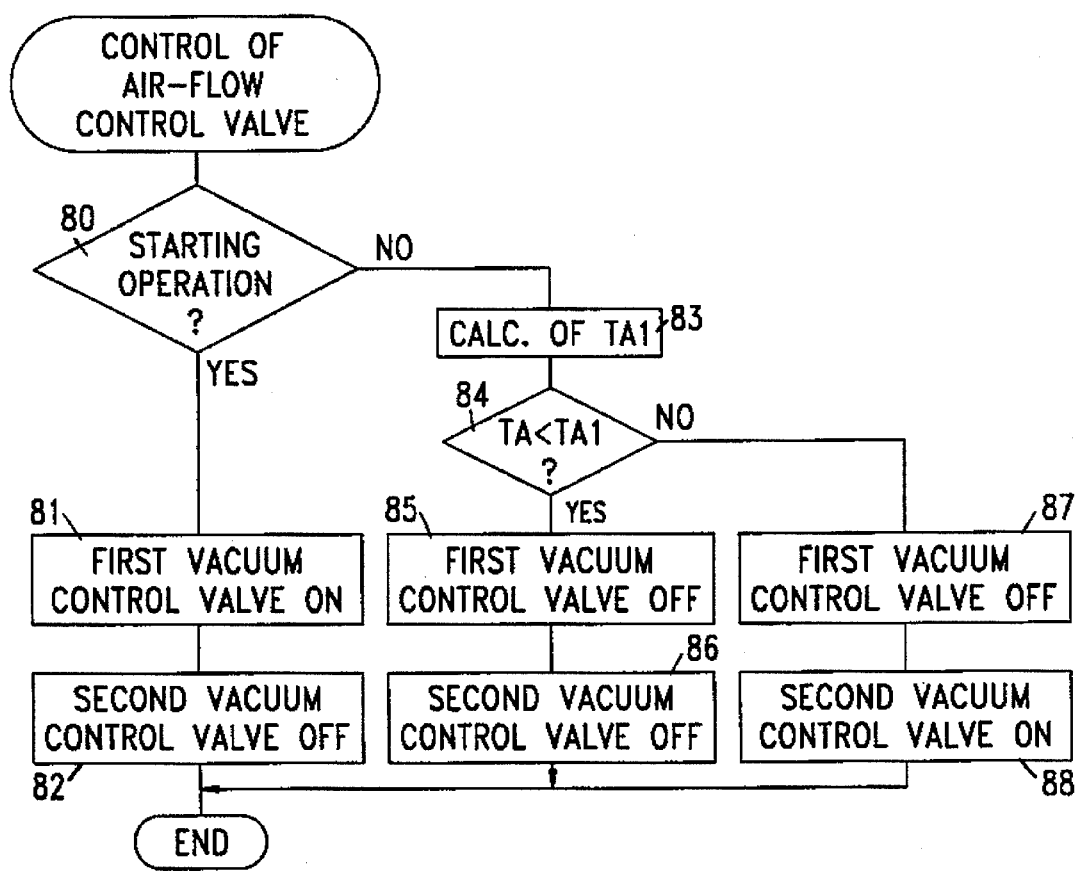
FIG. 8 is a flow chart of executing control of the air-flow control valve.

The first vacuum control valve 30 is energized only during an engine starting operation, and the second vacuum control valve 32 is energized only during the high load operation of the engine. Accordingly, power consumption can be reduced over the entire operating state of the engine. FIG. 8 shows a routine executing the first embodiment mentioned above. This routine is executed by interruption every predetermined time.

Referring to FIG. 8, at step 80, it is judged whether it is at an engine starting operation. Note that, in this embodiment, the engine starting operation is carried out in a period from the starting motor switch 36 is turned ON until the engine speed exceeds NO, as mentioned above. If it is at the engine starting operation, the routine proceeds to step 81, where the first vacuum control valve 30 is turned ON, and at following step B2, the second vacuum control valve 32 is turned OFF. As a result, both of the first and the second vacuum chambers 25 and 28 are communicated to the atmosphere, and thereby the air-flow control valve 17 is closed. Then, the processing cycle is ended.

If it is judged at step 80 that it is not at the engine starting operation, i.e., the engine starting operation has completed, the routine proceeds to step 83, where a reference degree of opening TA1 for the throttle valve 15 is calculated using the map shown in FIG. 4A. Then, the routine proceeds to step 84, where it is judged whether the degree of opening TA of the throttle valve 15 is smaller than the reference degree TA1. If TA<TA1, i.e., if the engine load is low, the routine proceeds to step 85, where the first vacuum control valve 30 is turned OFF, and at following step 86, the second vacuum control valve 32 is turned OFF. As a result, a negative pressure is introduced into the first vacuum chamber 25, and the atmosphere into the second vacuum chamber 28, and thereby the valve 17 is controlled to the half-open position. Then, the processing cycle is ended. If TA≧TA1 at step 84, i.e., if the engine load is high, the routine proceeds to step 87, where the first vacuum control valve 30 is turned OFF, and at following step 88, the second vacuum control valve 32 is turned ON. As a result, a negative pressure is introduced into the first and second vacuum chambers 25 and 28, and thereby the valve 17 is controlled to the full-open position. Then, the processing cycle is ended.

When the engine is stopped, both of the first and second vacuum control valves 30 and 32 are turned OFF. As a result, the second vacuum chamber 28 is communicated to the atmosphere. In the first vacuum chamber 25, however, the negative pressure is kept therein, and therefore the valve 17 is kept open.

In the above-mentioned embodiment, the branch 10 downstream of the air-flow control valve 17 serves as the second vacuum source. The second vacuum source may be an intake passage between the valve 17 and the throttle valve 15. Namely, the second vacuum source may be the branch 10 upstream of the valve 17 as well as the surge tank 11. Alternatively, the second vacuum source may be the intake duct 12 downstream of the throttle valve 17. Or, if the engine has a vacuum pump, at least one of the first and the second vacuum sources may be the vacuum pump.

Further, in the above-mentioned embodiment, the first and second vacuum control valves 30 nd 32 are constructed by three-way valves. The valves 30 and 32 may be solenoid valves that are controlled according to a duty factor, to control negative pressures in the first and second vacuum chambers 25 and 28. In this alternative, the degree of opening of the air-flow control valve 17 is continuously controllable between the closed position and the half-open position by controlling the duty factor of the solenoid valve serving as the first vacuum control valve. Similarly, the degree of opening of the valve 17 is continuously controllable between the half-open position and the full-open position by controlling the duty factor of the solenoid valve serving as the second vacuum control valve while the negative pressure is kept in the first vacuum chamber 25.

Figure 9:
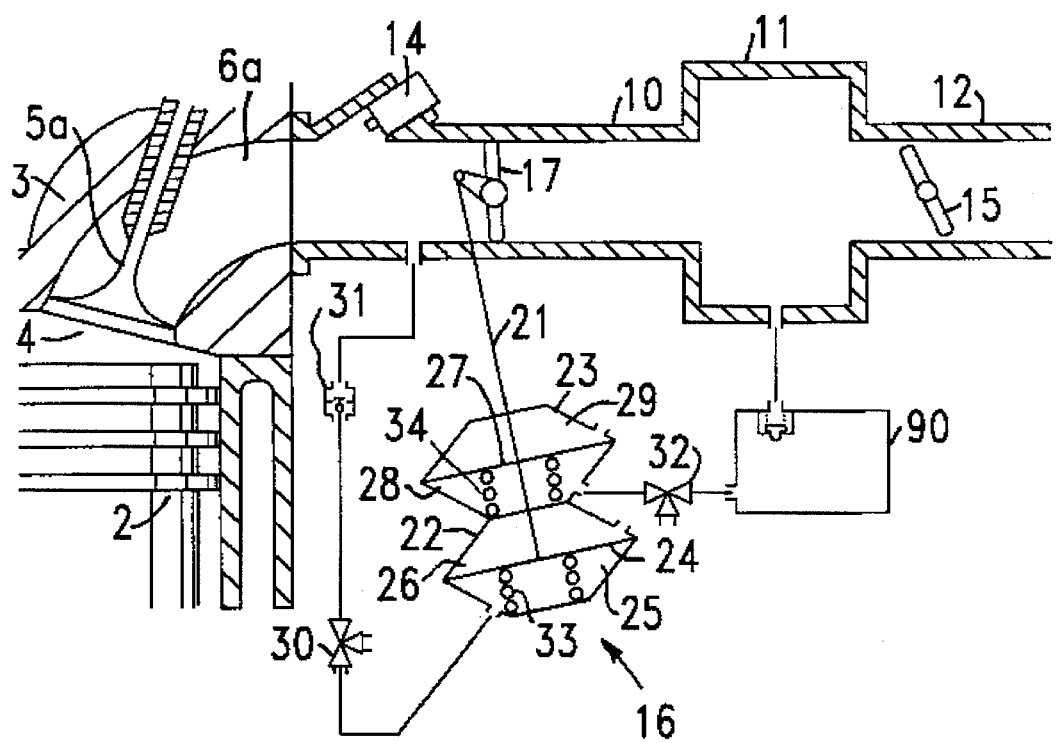
FIG. 9 is a partial view of a second embodiment of an engine.

FIG. 9 illustrates a second embodiment of the present invention. In this embodiment, similar components are indicated with same reference numerals as used in FIG. 1. Also, in this embodiment, an electronic control unit which is the same as the electronic control unit 50 illustrated in FIG. 1 is provided, but this unit is not depicted in FIG. 9.

Referring to FIG. 9, a first vacuum chamber 25 is connected to a branch 10 downstream of the air-flow control valve 17 via, in turn, a first vacuum control valve 30 and a check valve 31, similar to the arrangement of FIG. 1. A second vacuum chamber 28 is connected to a vacuum tank 90, via a second vacuum control valve 32. The vacuum tank 90 can maintain a negative pressure over the entire engine operation state, and serves as a second vacuum source, and is connected to a surge tank 11. The second vacuum control valve 32 introduces the negative pressure kept in the vacuum tank 90 to the second vacuum chamber 28 when the power is supplied thereto, and introduces the atmosphere to the second vacuum chamber 28 when the power supply is stopped.

When the engine starting operation finishes, it is preferable that the air-flow control valve 17 is quickly brought to a half-open position to assure a proper amount of air. Accordingly, one alternative is that, at a transitional condition just before the completion of the engine starting operation, i.e., from when the engine speed N exceeds, for example, 300 rpm until the engine speed N exceeds NO, the first vacuum control valve 30 is turned On to thereby introduce the negative pressure in the branch 10 into the first vacuum chamber 25. In this connection, the negative pressure in the branch 10 downstream of the valve 17 becomes larger as the engine speed becomes higher, and thus the negative pressure introduced into the first vacuum chamber 25 becomes larger. Accordingly, the valve 17 is gradually opened in this alternative. When the valve 17 is opened, however, the negative pressure in the branch 10 introduced into the first vacuum chamber 25 decreases, so that, in some cases, the valve 17 may not be kept at the half-open position after the engine starting operation is finished.

To solve this problem, in this embodiment, the second vacuum control valve 32 is controlled to communicate the second vacuum chamber 28 to the vacuum tank 90, while the first vacuum control valve 30 is controlled to communicate the first vacuum chamber 25 to the branch 10, at the transitional condition. As a result, the valve 17 is quickly made open and brought to the half-open position. Since the negative pressure in the vacuum tank 90 is ensured irrespective of the degree of opening of the valve 17 or the engine speed, the valve 17 is quickly brought to the half-open position at the transitional condition when the second vacuum chamber 28 is communicated to the vacuum tank 90. This results in increasing the amount of air fed to the engine, and thereby speedily increases the engine speed and speedily completes the engine starting operation. As mentioned above, the negative pressure in the first vacuum chamber 25 becomes larger as the engine speed becomes larger. Therefore, after the engine starting operation is completed, the valve 17 is assured to be maintained at the half-open position by only the negative pressure in the first vacuum chamber 25 without introducing the negative pressure into the second vacuum chamber 28. Accordingly, after the engine starting operation completes, i.e., after the engine speed exceeds 400 rpm, the valve 17 is controlled in the same manner as the embodiment of FIG. 1.

Figure 10:
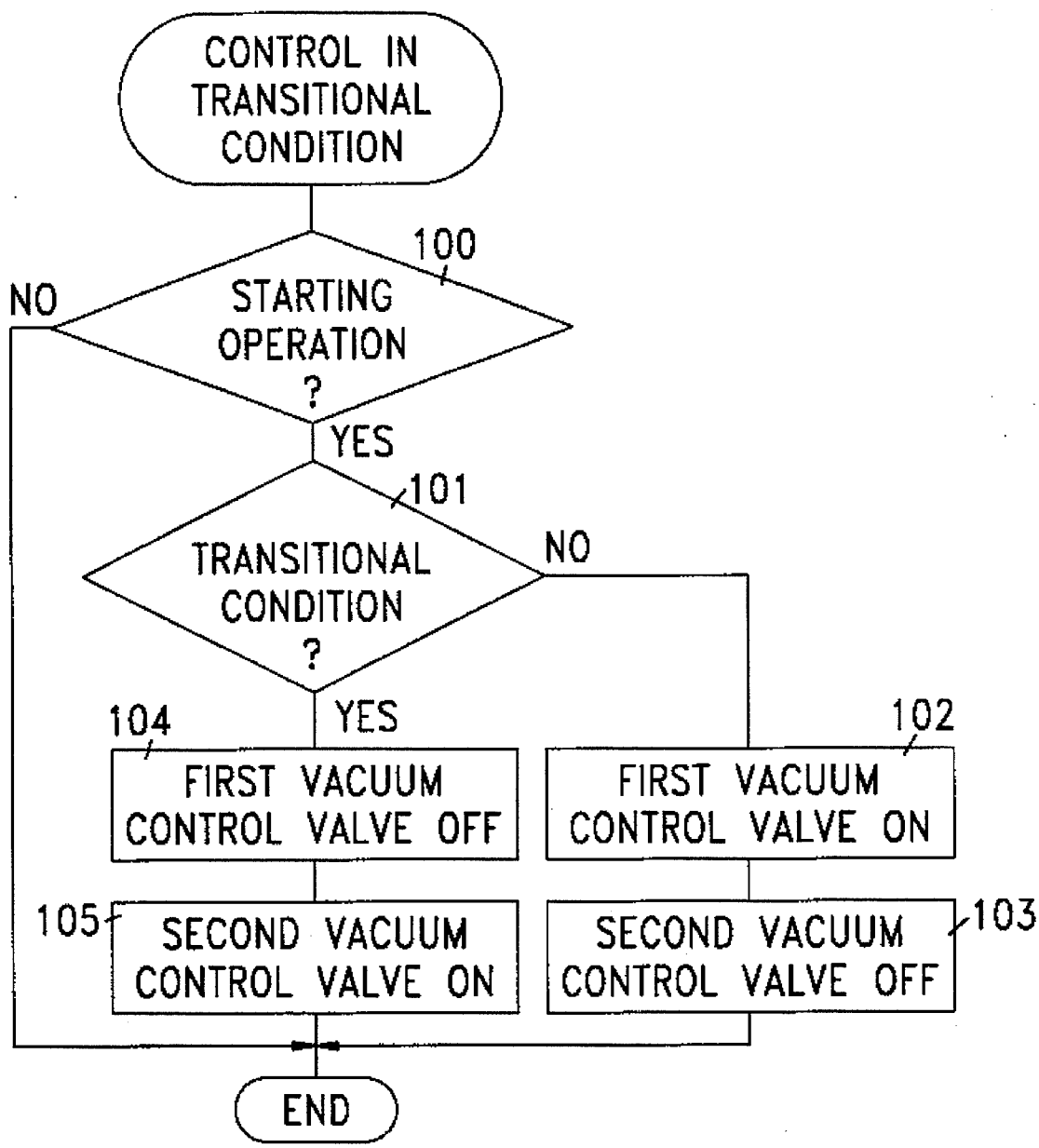
FIG. 10 is a flow chart of executing control of the air-flow control valve in a transitional condition.

FIG. 10 shows a routine for executing control of the air-flow control valve 17 at the transitional condition. This routine is executed by interruption every predetermined time.

Referring to FIG. 9, first, at step 100, it is judged whether an engine starting operation is in process. Note that, in this embodiment, the engine starting operation is carried out in a period from when the starting motor switch 36 is turned ON until the engine speed exceeds 400 rpm, as in the first embodiment. If the engine starting operation has been completed, the processing cycle is ended. If it is judged at step 100 that the engine starting operation is in process, the routine proceeds to step 101, where it is judged whether the engine is in a transitional condition, i.e., whether the engine speed N is greater than 300 rpm. If it is not in a transitional condition, i.e., if $N \leq 300$, the routine proceeds step 102, where the first vacuum control valve 30 is turned ON and, at following step 103, the second vacuum control valve 32 is turned OFF. When the first vacuum control valve 30 is turned ON, the first vacuum chamber 25 is communicated to the atmosphere. When the second vacuum chamber 28 is communicated to the atmosphere. As a result, the air-flow control valve 17 is closed. Then, the processing cycle is ended.

If it is judged at step 101 that the engine is in the transitional condition, i.e., if N>300, the routine proceeds to step 104, where the first vacuum control valve 30 is turned OFF and, at following step 105, the second vacuum control valve 32 is turned ON. When the first vacuum control valve 30 is turned OFF, the negative pressure in the branch 10 is introduced into the first vacuum chamber 25. When the second vacuum control valve 32 is turned ON, the negative pressure in the vacuum tank 90 is introduced into the second vacuum chamber 28. As a result, the air-flow control valve 17 is made open with a large force. In this way, the valve 17 is quickly opened at the transitional condition. Then, the processing cycle is ended.

In the second embodiment described with reference to FIG. 9, the vacuum tank 90 is connected to the surge tank 11 to store the negative pressure produced in the surge tank 11 therein. Alternatively, the vacuum tank 90 may be connected to the branch 10 downstream of the air-flow control valve 17 to store the negative pressure produced in the branch 10 in the vacuum tank 90. The other arrangements and operations of the driving apparatus 16 of FIG. 9 are the same as those of FIG. 1, and therefore, they are not explained again.

Figure 11:
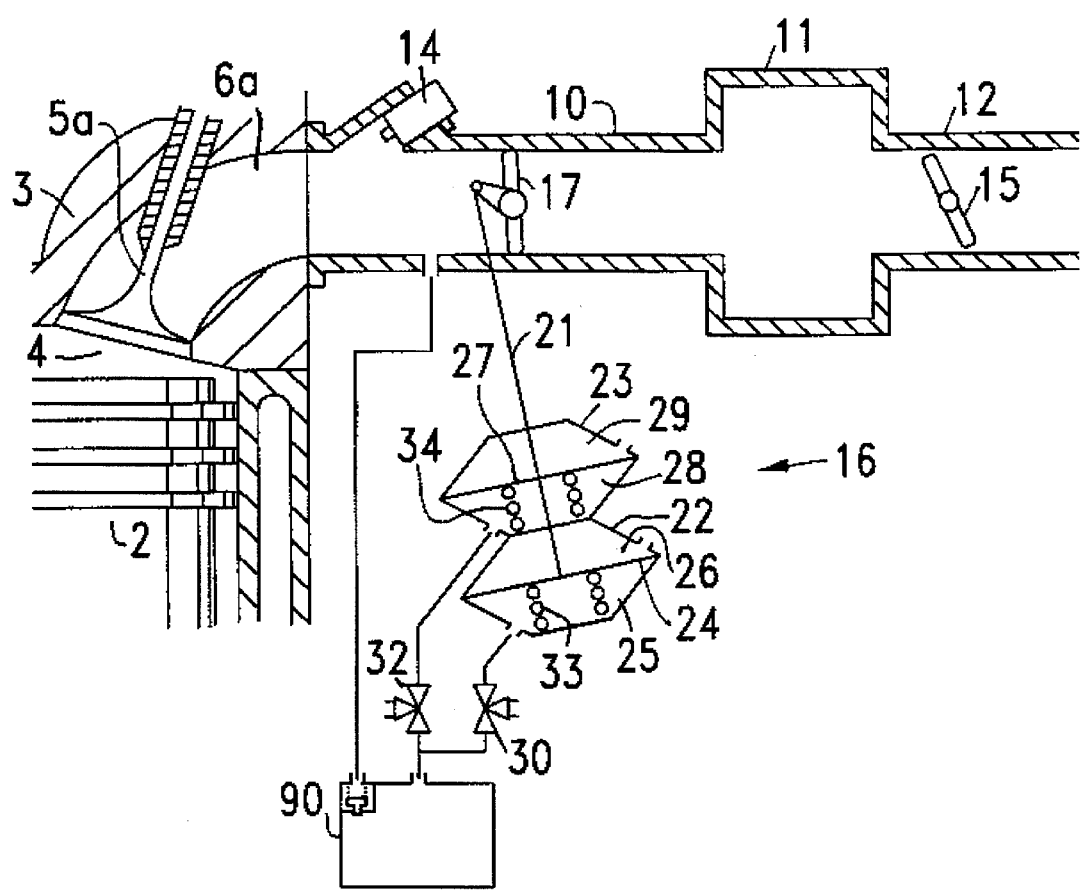
FIG. 11 is a partial view of a third embodiment of an engine.

FIG. 11 illustrates a third embodiment of the present invention. In this embodiment, similar components are indicated with same reference numerals as used in FIG. 9. Also, in this embodiment, an electronic control unit which is the same as the electronic control unit 50 illustrated in FIG. 1 is provided, but this unit is not depicted in FIG. 11.

Referring to FIG. 11, a first vacuum chamber 25 is connected to a vacuum tank 90 via a first vacuum control valve 30, and a second vacuum chamber 28 is connected to the vacuum tank 90 via a second vacuum control valve 32. The vacuum tank 90 stores the negative pressure produced in a branch 10 downstream of the air-flow control valve 17. Therefore, the vacuum tank 90 serves as a first vacuum source as well as a second vacuum source, in this embodiment. The first vacuum control valve 30 communicates the first vacuum chamber 25 to the atmosphere to introduce the atmospheric pressure therein when it is turned ON, and the first valve 30 communicates the first chamber 25 to the vacuum tank 90 to introduce the negative pressure therein when it is turned OFF. The second vacuum control valve 32 communicates the second vacuum chamber 28 to the vacuum tank 90 to introduce the negative pressure therein when it is turned ON, and the second valve 32 communicates the second chamber 28 to the atmosphere to introduce the atmospheric pressure therein when it is turned OFF.

As mentioned above, if the air-flow control valve 17 is gradually opened just before the completion of an engine starting operation, the negative pressure in the branch 10 downstream of the valve 17 gradually weakens. Namely, the negative pressure in the branch 10 may be insufficient to quickly open the valve 17 even if this negative pressure is introduced into the first vacuum chamber 25. To solve this problem, in the embodiment shown in FIG. 11, at a transitional condition just before the completion of the engine starting operation, the first vacuum control valve 30 is controlled to introduce the negative pressure in the vacuum tank 90 into the first vacuum chamber 25, as well as the second vacuum control valve 32 is controlled to introduce the negative pressure in the vacuum tank 90 into the second vacuum chamber 28. The negative pressure in the vacuum tank 90 is independent of the engine operating conditions, as described above. Accordingly, by introducing the negative pressure into the first and second vacuum chambers 25 and 28, the valve 17 is quickly made open, at the transitional condition. This further improves the starting ability of the engine.

When the engine is stopped, the first vacuum control valve 30 continuously communicates the first vacuum chamber 25 to the vacuum tank 90, thereby to keep the air-flow control valve 17 open. Therefore, a check valve to keep the negative pressure in the first vacuum chamber 25 is not required.

In this connection, if the volume of the vacuum tank 90 is made larger, it is not necessary to introduce the negative pressure therein into the first and second vacuum chambers 25 and 28 at the transitional condition. Namely, in this case, it is sufficient to introduce the negative pressure into the first and second vacuum chambers 25 and 28 when the engine starting operation completes to make the air-flow control valve 17 quickly open.

In the embodiment described above, the vacuum tank 90 is connected to the branch 10 to store the negative pressure produced therein. Alternatively, the vacuum tank 90 may be connected to an intake passage between the valve 17 and a throttle valve 15, such as a surge tank 11, so as to store the negative pressure produced in the surge tank 11. The other arrangements and operations of the driving apparatus 16 are the same as those of the embodiment of FIG. 1, and therefore, they are not explained again.

Figure 12:
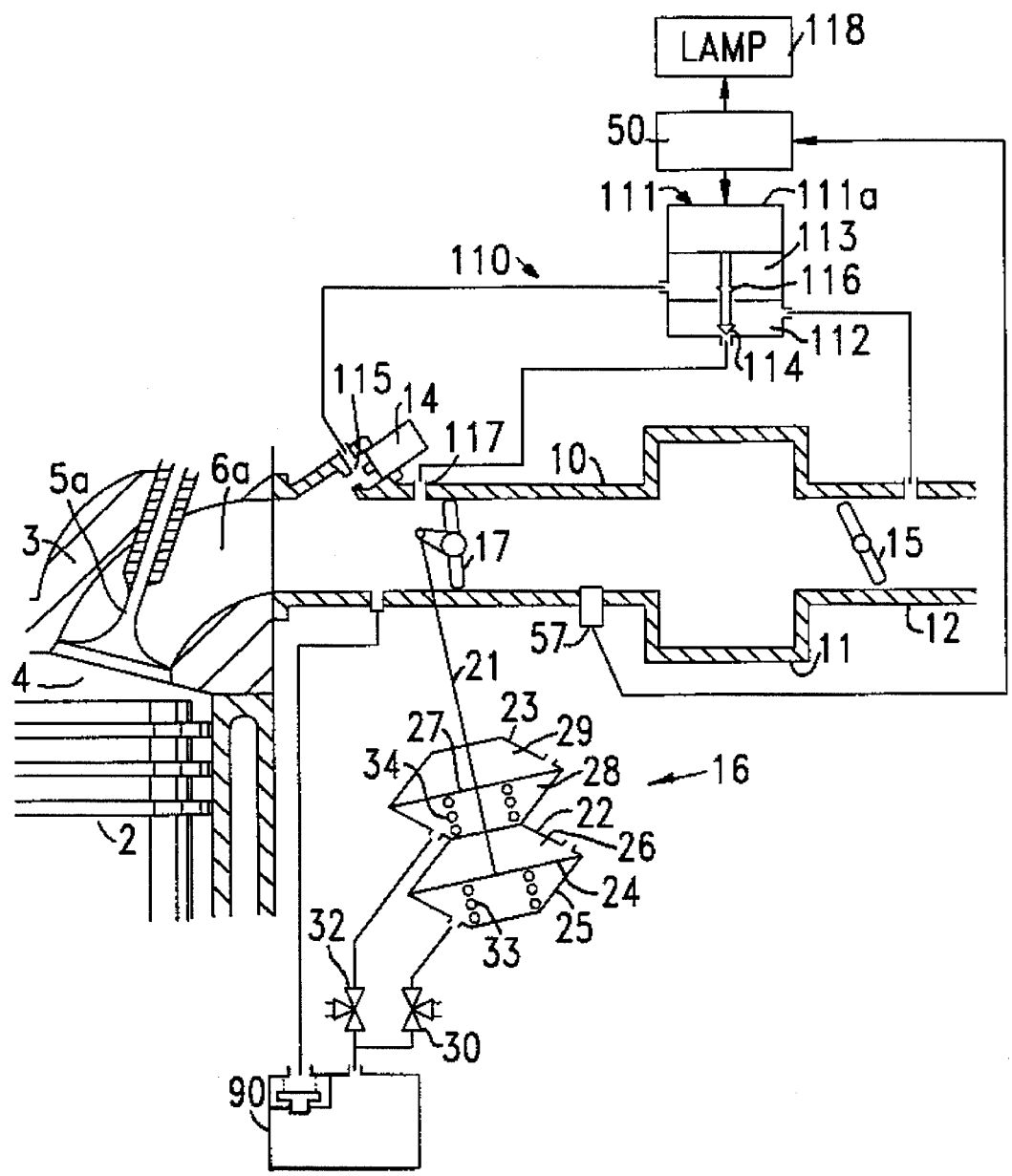
FIG. 12 is a partial view of a fourth embodiment of an engine.

FIG. 12 illustrates a fourth embodiment of the present invention. In this embodiment, similar components are indicated with same reference numerals as used in FIG. 11. Also, in this embodiment, an electronic control unit which is the same as the electronic controm unit 50 illustrated in FIG. 1 is provided, but this unit 50 is simplified to a box in FIG. 12.

The driving apparatus 16 according to this embodiment is the same as that shown in FIG. 11. Referring to FIG. 12, an air-assists chamber 115 communicating to a branch 10 downstream of the air-flow control valve 17 is provided, and a fuel injector 14 is arranged in the air-assist chamber 115. Further, a bypass unit 110 is provided to intercommunicate an intake duct 12 upstream of a throttle valve 15 with the branch 10 downstream of the air-flow control valve 17.

The bypass unit 110 comprises a bypass control valve 111, which has a high-pressure chamber 112 and a low-pressure chamber 113. The high-pressure chamber 112 is connected, on one side, to the intake duct 12 upstream of the throttle valve 15, and on another side, to an air port 117 formed in the branch 10 downstream of the air-flow control valve 17. In the high-pressure chamber 112, a control valve 114 for controlling an amount of air flowing from the duct 12 toward the air port 117 is arranged. On the other hand, the low-pressure chamber 113 is connected, on one side, to the high-pressure chamber 112, and on another side, to the air-assist chamber 115. In the low-pressure chamber 113, a control valve 116 for controlling an amount of air flowing from the high-pressure chamber 112 toward the air-assist chamber 115 is arranged. The valves 114 and 116 are formed on a common valve shaft, which is axially moved by a step motor 111a. This step motor 111a is controlled by signals output from an electronic control unit 50.

Figure 13:
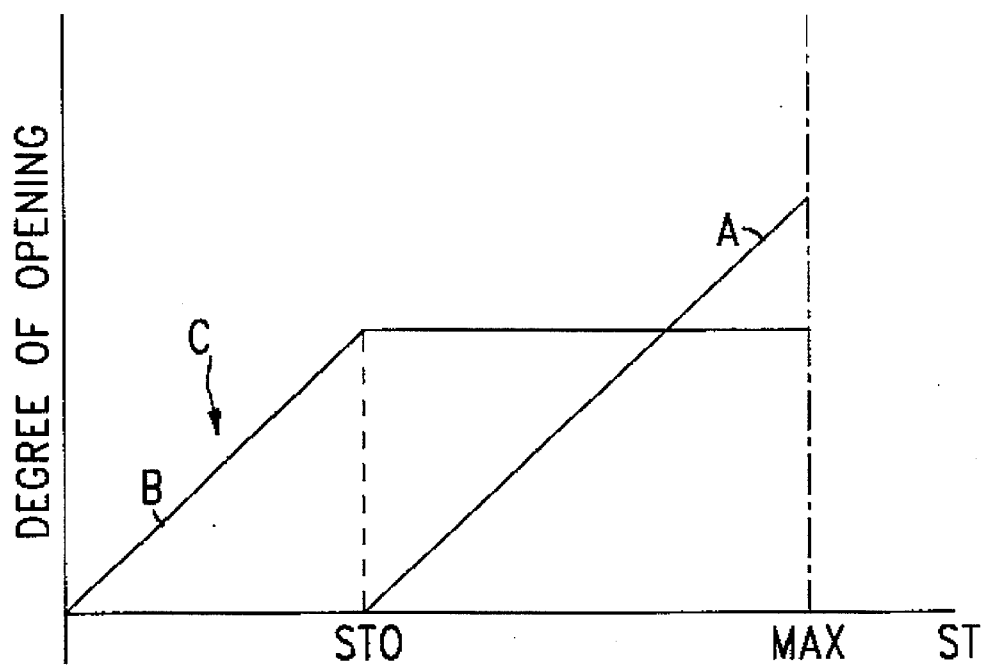
FIG. 13 is a diagram illustrating a degree of opening of a bypass control valve.

Further, an alarm lamp 118 is provided and connected to the unit 50. Next, the degrees of opening of the valves 114 and 115 will be explained with reference to FIG. 13. FIG. 13 illustrates relationships among the degrees of opening of the valves 114 and 116 and the step positions of the step motor 11a. A solid line A represents the degree of opening of the valve 114, and a solid line B represents the degree of opening of the valve 116. When the step position ST of the step motor 111a is made zero, each of degrees of opening of the valves 114 and 116 is made zero, that is, both of the valves 114 and 116 are made closed. As the step position ST increases from zero, the vale shaft is caused to move upwardly in FIG. 12. At this time, the degree of opening of the valve 114 is kept at zero. On the other hand, the degree of opening of the valve 116 increases as the step position ST increases, that is, the valve 116 is opened. When the step position ST reaches STO, the degree of opening of the valve 116 reaches a maximum degree thereof, and the degree of opening of the valve 116 is kept at the maximum degree even if the etep position ST further increases. On the other hand, the valve 114 starts to open once the step position ST exceeds the position ST0, Until the step position ST reaches a maximum step position MAX, the degree of opening of the valve 114 increases as the step position ST increases. Accordingly, the amount of air supplied to the branch 10 through the bypass control valve 111 increases as the step position ST increases.

When the valve 116 is made open, air in the high-pressure chamber 112 flows into the air-assist chamber 115 through the low-pressure chamber 113. This additional air collides the fuel from the fuel injector 14, and thereafter the additional air and the fuel in the air-assist chamber 115 jet out into the branch 10. As a result, the additional air helps atomize the fuel injected. When the valve 114 is made open, air in the high-pressure chamber 112 flows into the branch 10 through the air port 117, and into;the air-assist chamber 115. The bypass control valve 111 controls the amount of air supplied to the air-assist chamber 115, and thereby the engine speed during an idling operation of the engine. During the idling operation after the completion of an engine starting operation, the step position of the step motor 111a is controlled around a position C in FIG. 13, to control the degree of opening of the valve 116 so that the engine speed is maintained at a desired speed.

In this connection, if a first diaphragm 24 is broken, the air-flow control valve 17 will not be made open or will be made open only slightly even when a large negative pressure is introduced into a first vacuum chamber 25, under a low engine load. Or, if a first vacuum control valve 30 is broken, no negative pressure is introduced into the first vacuum chamber 25, or only a small negative pressure will be introduced into the first vacuum chamber 25 thereby to open the valve 17 slightly. Further, if the first vacuum control valve 30 is broken, the valve 17 will be made close when the engine is stopped. This will cause the above-mentioned icing wherein the valve 17 is fixed at the closed position. If the valve 17 is kept at the closed position or is slightly opened when an engine starting operation completes, a shortage of air will occur to improperly operate the engine. Accordingly, in this embodiment, if a failure, wherein the valve 17 is not moved to a half-open position when the valve is to be controlled to the half-position, occurs, a second vacuum control valve 32 is controlled to introduce the negative pressure into a second vacuum chamber 28, while the first vacuum control valve 30 is controlled to introduce the negative pressure into the first vacuum chamber 25, so that the larger driving force is assured to make the valve 17 open. As a result, the valve 17 can be opened, or the degree of opening of the valve 17 can be enlarged, as long as a second diaphragm 27 and the second vacuum control valve 32 are sound. Once the valve 17 is made open, an amount of air fed into the engine is ensured thereby to increase the output torque of the engine.

Figure 14:
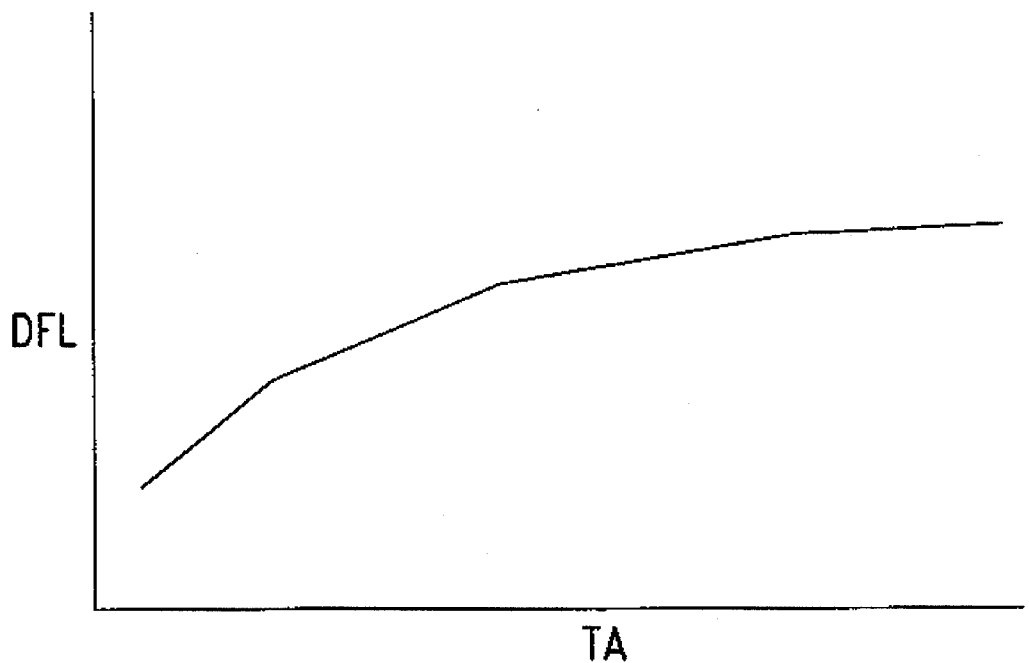
FIG. 14 is a diagram illustrating a correction value.

Further, in this embodiment, if it is determined that the failure occurs, the step position of the step motor 111a of the bypass control valve 111 is controlled to increase an amount of the additional air fed into the engine. Namely, if it is determined that a failure occurs, a correction value DFL which is obtained according to the engine operating condition is added to the step position ST. As shown in FIG. 14, the correction value DFL becomes larger as the degree of opening TA of the throttle valve 15 becomes larger. The value DFL represents an additional amount of air to obtain the proper amount of air when the failure occurs, and is stored in the ROM 52. As the step position ST increases, the bypass unit 110 increases the total amount of air fed into the branch 10, and thereby the output torque of the engine is ensured.

As the bypass unit 110 increases the amount of additional air flowing into the branch 10 in the above mentioned manner, the negative pressure produced in the branch 10 decreases. Accordingly, if the negative pressure is supplied from the branch 10 to the second vacuum chamber 28, the negative pressure in the second vacuum chamber 28 may be insufficient to keep the valve 17 open when a failure occurs. In this embodiment, however, the negative pressure is supplied from the vacuum tank 90 to the second vacuum chamber 28, and thus the negative pressure in the second vacuum chamber 28 is made large without regard to the negative pressure produced in the branch 10.

Further, in this embodiment, when it is determined that a failure wherein the air-flow control valve 17 malfunctions, occurs, the alarm lamp 118 is turned ON thereby to notify an operator of the engine of the failure.

A method of determining whether the failure wherein the air-flow control valve 17 malfunctions occurs will be explained. This failure determination operation is carried out during an idling operation of the engine. During the idling operation, the vacuum control valves 30 and 32 are controlled so that the air-flow control valve 17 is maintained at the half-open position. If the failure occurs, the negative pressure produced in the branch 10 upstream of the valve 17 becomes smaller than that at a normal idling operation, since air in the branch 10 is not sucked into the engine. Therefore, first, a reference negative pressure MV0 which is smaller than a negative pressure produced when the valve 17 is made open, under the current engine operating condition, is predetermined. Next, a current negative pressure MV in the branch 10 using the sensor 57 at the idling operation is detected, and then the negative pressure MV is compared with the reference pressure MV0. If MV<MV0, it is determined that the valve 17 has malfunctioned. If MV≧MV0, it is determined that the valve 17 is normal. Alternatively, to determine the failure, it may be possible to compare, for example, the engine speed N, or the amount of air per an unit engine speed Q/N with their reference values, each of which is obtained when the valve 17 is normal. In this alternative, it is possible to determine the failure not only during the idling operation but also during other engine operating conditions.

Figure 15:
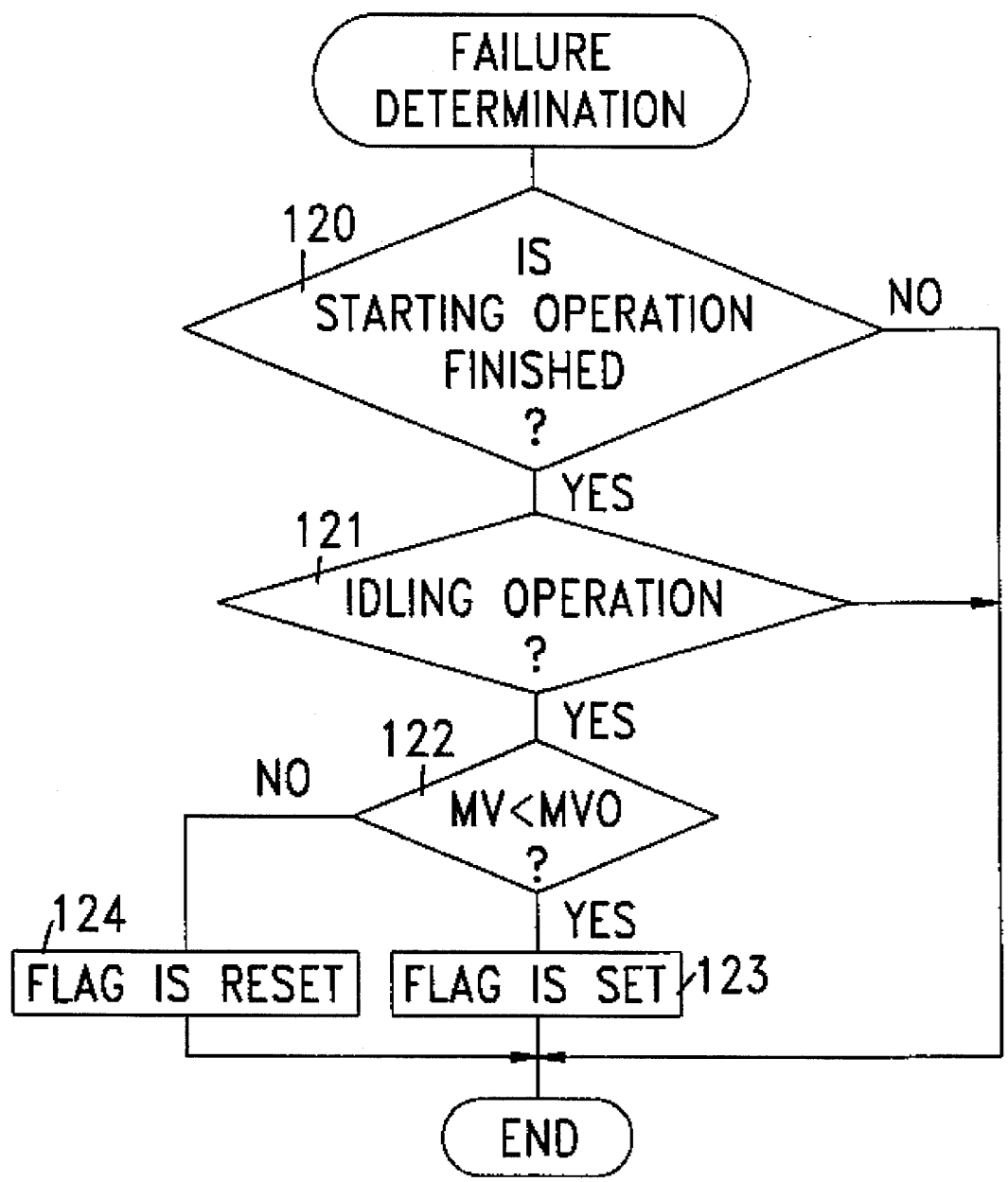
FIG. 15 is a flow chart of executing a failure determination.

FIG. 15 shows a routine for executing a failure determination mentioned above. This routine is executed by interruption every predetermined time.

Referring to FIG. 15, at step 120, it is judged whether an engine starting operation has finished. If the engine starting operation has not finished, the processing cycle is ended. If it has finished, the routine proceeds to step 121, where it is judged whether it is at an idling operation of the engine. In this embodiment, it is judged that it is at the idling operation when the throttle valve 15 is made close and the vehicle speed is zero. If it is judged that it is not at the idling operation, the processing cycle is ended. If it is judged that it is at the idling operation, the routine proceeds to step 122, where it is judged whether the current negative pressure MV in the branch 10 upstream of the air-flow control valve 17 is smaller than the predetermined reference negative pressure MV0. If MV<MV0, it is judged that a failure occurred and, at following step 123, a flag, which is set when it is judged that the failure occurred, is set. Then, the processing cycle is ended. If MV≧MV0 at step 122, the valve 17 is judged to be normal, and at following step 124, the flag is reset. Then, the processing cycle is ended.

Figure 16:
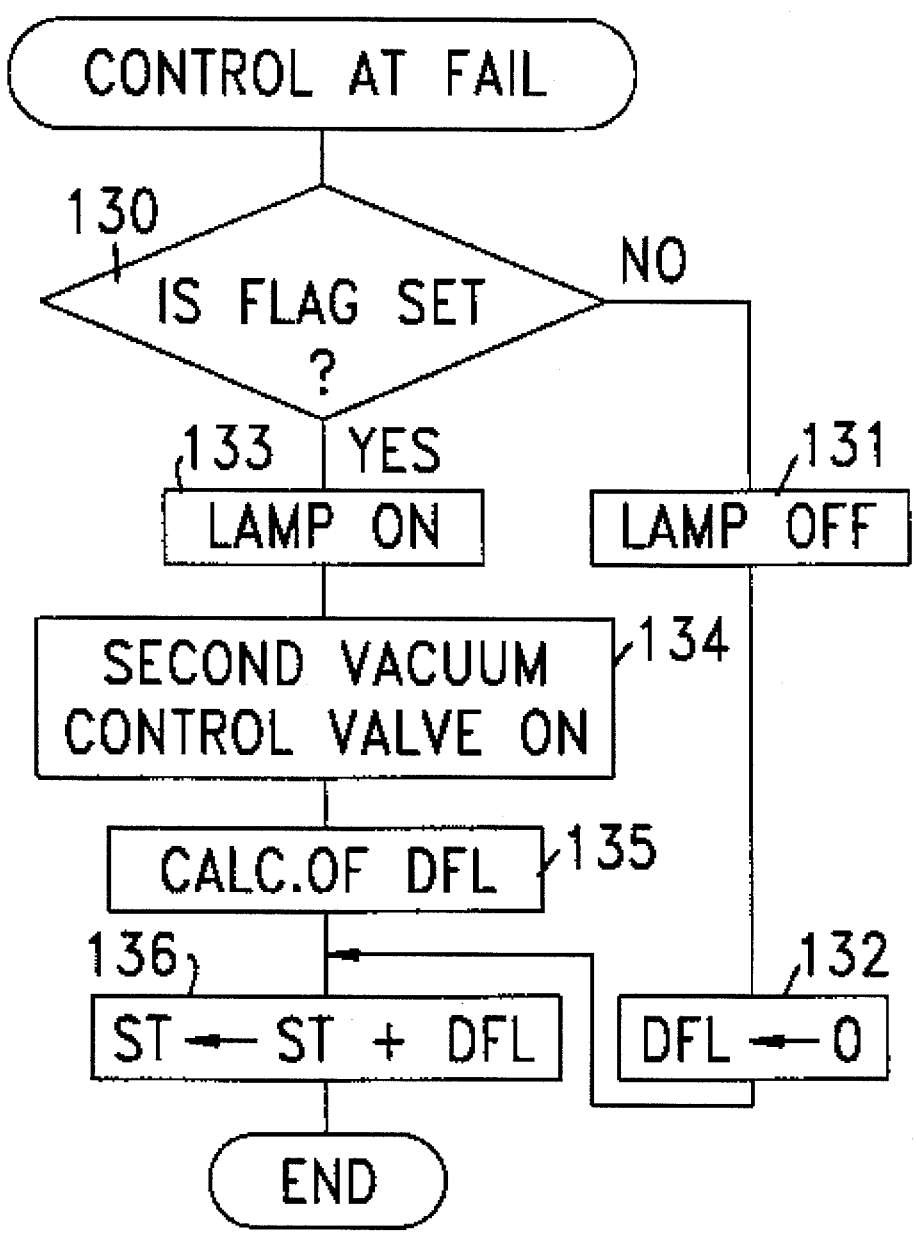
FIG. 16 is a flow chart of executing a control at a fail condition.

FIG. 16 shows a routine for executing control at the failure mentioned above. This routine is executed by interruption every predetermined time.

Referring to FIG. 16, at step 130, it is determined whether the flag, which is set and/or reset in the routine shown in FIG. 15, is set. If the flag is reset, i.e., if the air-flow control valve 17 is normal, the routine proceeds to step 131, where the alarm lamp 118 is turned OFF. Next, the routine proceeds to step 132, where the correction value DFL of the step position ST of the step motor 111a is made zero, and the routine jumps to step 136.

If it is determined at step 130 that the flag is set, i.e., if it is judged that the air-flow control valve 17 has failed, the routine proceeds to step 133 where the alarm lamp 118 is turned ON to thereby notify the engine operator of the failure. Then, the routine proceeds to step 134, where the second vacuum control valve 32 is turned ON to introduce the negative pressure in the vacuum tank 90 into the second vacuum chamber 28. At following step 135, the correction value DFL is calculated using the map shown in FIG. 14. Then, the routine proceeds to step 136, where the step position ST is calculated using the following equation:

ST=ST+DFL

The step motor 111a of the bypass control valve 111 is controlled to attain the step position ST. Then, the processing cycle is ended.

In this connection, if another failure, such as the air-flow control valve 17 does not move to the full-open position or is kept at, for example, the half-open position when the engine is operated under high load, occurs, the amount of air per an unit engine speed Q/N becomes small.

Accordingly, first, a reference amount (Q/N)0 that is normally exceeded when the valve 17 is at the fuel-open position is predetermined. Next, the current Q/N is compared with the reference amount (Q/N)0, and if Q/N <(Q/N)0, it is judged that the air-flow control valve 17 is not at the full-open position. If Q/N≧(Q/N)0, it is judged that the valve 17 is normal. When it is determined that the failure has occurred, an alarm lamp 118 is turned ON to thereby notify the engine operator of the failure.

Figure 17:
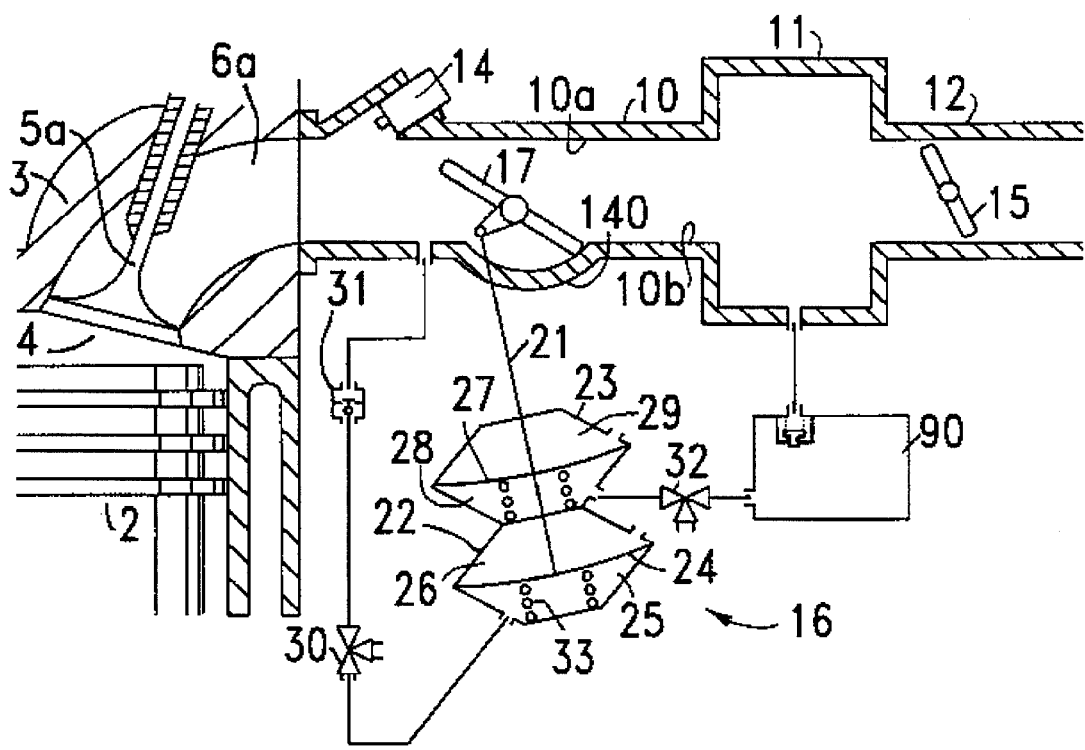
FIG. 17 is a partial view of a fifth embodiment of an engine.

FIG. 17 illustrates a fifth embodiment of the present invention. In this embodiment, similar components are indicated with same reference numerals as used in FIG. 9. Also, in this embodiment, an electronic control unit which is the same as the electronic control unit 50 illustrated in FIG. 1 is provided, but this unit is not depicted in FIG. 17.

A first vacuum chamber 25 is connected to a branch 10 downstream of the air-flow control valve 17 via, in turn, a first vacuum control valve 30 and a check valve 31, as in the embodiment shown in FIG. 9. A second vacuum chamber 28 is connected to a vacuum tank 90 via a second vacuum control valve 32. When the power is supplied to the first vacuum control valve 30, the valve 30 communicates the first vacuum chamber 25 to the atmosphere, and when the power supply is stopped, the valve 30 communicates the chamber 25 to the branch 10. When the power is supplied to the second vacuum control valve 32, the valve 32 communicates the second vacuum chamber 28 to the atmosphere, and when the power supply is stopped, the valve 32 communicates the chamber 28 to the vacuum tank 90.

During the engine starting operation, both of the vacuum control valves 30 and 32 are turned ON to thereby introduce the atmosphere to the vacuum chambers 25 and 28. As a result, the air-flow control valve 17 is closed. After the engine starting operation is completed, when the air-flow control valve 17 is to be brought to a half-open position, the first vacuum control valve 30 is turned OFF and the second vacuum control valve 32 is turned ON. As a result, a negative pressure is introduced into the first vacuum chamber 25, and the atmospheric pressure is introduced into the second vacuum chamber 28, and thereby the valve 17 is brought into the half-open position. When the valve 17 is to be brought into the full-open position, the valve 30 and 32 are both turned OFF. Therefore, the negative pressure is introduced into each of the first and second vacuum chambers 25 and 28, and thereby the valve 17 is brought into the full-open position. When the engine is stopped, the valves 30 and 32 are both turned OFF. In this condition, the check valve 31 maintains the negative pressure in the first vacuum chamber 25, and the negative pressure in the vacuum tank 90 is introduced into the second vacuum chamber 28. As a result, the valve 17 is kept at the full-open position.

Further, referring to FIG. 17 again, a lower wall part 10b of the branch 10 on the inner surface thereof comprises a depression 140, with which a disk 19 of the air-flow control valve 17 can contact. When the valve position of the air-flow control valve 17 is between the close-position and the half-open position, the disk 19 of the valve 17 is in contact with the depression 140, and therefore, substantially no gap between the disk 19 and the lower wall part 10b is formed. Accordingly, when the valve 17 is at the half-open position as shown in FIG. 17, substantially all the air passing through the valve 17 flows through a gap formed between the valve 17 and an upper wall part 10a of the branch 10. Accordingly, substantially all the air passing through the valve 17 is guided toward a fuel injector 14 by the valve 17, and thus, the atomization of the injected fuel is further enhanced. When the degree of opening of the valve 17 is larger than that when the valve 17 is in the half-open position, the disk 19 of the valve 17 detaches from the depression 140, and thus, an additional gap is formed between the lower wall part 10b and the disk 19. This results in securing a suitable amount of air.

In the above-mentioned embodiments shown in, for example, FIG. 1, the air-flow control valve 17 is prevented from icing by keeping a negative pressure in the first vacuum chamber 25 and introducing the atmospheric pressure into the second vacuum chamber 28, to thereby keep the valve 17 at the half-open position when the engine is stopped. According to this embodiment, however, the lower end of the disk 19 of the valve 17 is in contact with the depression 140 even if the valve 17 is at the half-open position. In this case, the half-open position of the valve 17 is incapable of preventing icing when the engine is stopped. To solve this problem, the embodiment of FIG. 17 maintains negative pressures in the first and second vacuum chambers 25 and 28 when the engine is stopped, thereby to keep the valve 17 at the full-open position. When the valve 17 is at the full-open position or at a position larger than the half-open position, the disk 19 of the valve 17 detaches from the upper and lower walls of the branch 10. This prevents icing of the valve 17 even if the branch 10 has the depression 140. The other arrangements and operations of the driving apparatus 16 for driving the valve 17 are the same as those of the embodiment of FIG. 9, and therefore, they are not explained again.

According to the present invention, it is possible to provide an air-flow control device which can be made easily and at a low cost.

While the invention has been described by reference to specific embodiments chosen for purposes of illustration, it should be apparent that numerous modifications could be made thereto by those skilled in the art without departing from the basic concept and scope of the invention.

We claim:

1. An air-flow control device for an engine having an intake passage and a fuel injector arranged in the intake passage for injecting fuel into the intake passage, the device comprising:

an air-flow control valve arranged in the intake passage on the upstream of the fuel injector, the air-flow control valve being closed during an engine starting operation, and being open after the engine starting operation is finished;

first and second vacuum sources;

a driving apparatus for driving the air-flow control valve, the apparatus comprising:

first and second vacuum chambers;

a first vacuum control valve for selectively connecting the first vacuum chamber to either the first vacuum source or the atmosphere to introduce the negative pressure or the atmospheric pressure into the first vacuum chamber; and a second vacuum control valve for selectively connecting the second vacuum chamber to either the second vacuum source or the atmosphere to introduce the negative pressure or the atmospheric pressure into the second vacuum chamber, the apparatus driving the air-flow control valve so that a degree of opening thereof becomes larger as the negative pressure in the first and the second vacuum chamber becomes larger; and control means for controlling the apparatus so that each of the first and the second vacuum control valves introduces the atmospheric pressure into the corresponding vacuum chamber to thereby ensure that the air-flow control valve is closed during an engine starting operation, and that the first and the second vacuum control valves control the negative pressures in the corresponding vacuum chamber to thereby keep the air-flow control valve open and to thereby control a degree of opening of the air-flow control valve after the engine starting operation is finished.

2. An air-flow control device according to claim 1, wherein, when the engine starting operation is finished, the control means controls the apparatus so that the first vacuum control valve introduces the negative pressure into the first vacuum chamber to thereby the air-flow control valve is made open, and wherein, after the engine starting operation is finished, the control means controls the apparatus so that the first vacuum control valve continuously introduces the negative pressure into the first vacuum chamber to thereby ensure that the air-flow control valve is maintained open, and that the second vacuum control valve controls the negative pressure introduced into the second vacuum chamber to control the degree of opening of the air-flow control valve.

3. An air-flow control device according to claim 2, wherein the control means controls the apparatus so that the second vacuum control valve introduces the atmospheric pressure into the second vacuum chamber when an engine load is lower than a predetermined load to thereby make the air-flow control valve partially open, and introduced the negative pressure into the second vacuum chamber when an engine load is higher than the predetermined load to thereby fully open the air-flow control valve.

4. An air-flow control device according to claim 1, wherein the control means controls the apparatus so that at least one of the first and the second vacuum control valves introduces the negative pressure into the corresponding vacuum chamber during a predetermined period just before the engine starting operation is finished.

5. An air-flow control device according to claim 4, wherein the control means controls the apparatus so that each of the first and second vacuum control valves introduces the negative pressure into the corresponding vacuum chamber during the predetermined period.

6. An air-flow control device according to claim 4, wherein the predetermined period is from when an engine speed exceeds a predetermined speed until the engine starting operation is finished.

7. An air-flow control device according to claim 1, wherein at least one of the first and the second vacuum sources is the intake passage downstream of the air-flow control valve.

8. An air-flow control device according to claim 1, the engine further having a throttle valve arranged in the intake passage upstream of the air-flow control valve, wherein the second vacuum source is the intake passage between the air-flow control valve and the throttle valve.

9. An air-flow control device according to claim 1, the device further comprising a vacuum tank which can temporarily store a negative pressure therein, wherein at least one of the first and the second vacuum sources is the vacuum tank.

10. An air-flow control device according to claim 9, wherein the vacuum tank is connected to the intake passage downstream of the air-flow control valve so that the vacuum tank stores the negative pressure produced in the intake passage on the downstream of the air-flow control valve.

11. An air-flow control device according to claim 9, the engine further having a throttle valve arranged in the intake passage upstream of the air-flow control valve, wherein the vacuum tank is connected to the intake passage between the air-flow control valve and the throttle valve so that the vacuum tank stores the negative pressure produced in the intake passage between the air-flow control valve and the throttle valve.

12. An air-flow control device according to claim 9, wherein both of the first and the second vacuum sources are the common vacuum tank.

13. An air-flow control device according to claim 1, wherein the device further comprises negative pressure keeping means for keeping the negative pressure in at least one of the first and the second vacuum chambers, regardless the operating condition of the first and the second vacuum control valves to thereby keep the air-flow control valve open when the engine is stopped.

14. An air-flow control device according to claim 13, wherein the negative pressure keeping means keeps the negative pressure in the first vacuum chamber when the engine is stopped.

15. An air-flow control device according to claim 14, the negative pressure keeping means comprising a check valve arranged between the first vacuum control valve and the first vacuum source, the check valve allowing a fluid to flow only from the first vacuum control valve toward the first vacuum source, wherein the negative pressure keeping means controls the apparatus so that the first vacuum control valve connects the first vacuum chamber to the first vacuum source when the engine is stopped.

16. An air-flow control device according to claim 14, wherein the second vacuum control valve introduces the atmospheric pressure into the second vacuum chamber when the engine is stopped.

17. An air-flow control device according to claim 1, the device further comprising determining means for determining whether the air-flow valve is opened after the engine starting operation is finished, wherein the control means controls the apparatus so that each of the first and the second vacuum control valves introduces negative pressure into the corresponding vacuum chamber, when the determining means determines that the air-flow control valve is not opened.

18. An air-flow control device according to claim 17, wherein the determining means determines that the air-flow control valve is opened by comparing a parameter which indicates the engine operating contusion with that which is obtained when the air-flow control valve is made open.

19. An air-flow control device according to claim 18, the determining means comprising detecting means for detecting the amount of air fed into the engine, wherein the parameter is the amount of air fed into the engine.

20. An air-flow control device according to claim 17, the determining means determines whether the air-flow control valve is made open when the engine is in an idling operation.

21. An air-flow control device according to claim 17, the device further comprising additional air feeding means for feeding additional air into the intake passage downstream of the air-flow control valve, wherein the additional air feeding means feeds additional air to the engine when the determining means determines that the air-flow control valve is not opened.

22. An air-flow control device according to claim 21, wherein an amount of additional air fed into the engine is increased as the engine load becomes higher.

23. An air-flow control device according to claim 21, wherein an outlet of the additional air feeding means is arranged close to an outlet of the fuel injector so that the additional air collides with fuel injected by the fuel injector.

24. An air-flow control device according to claim 17, wherein the device further comprises notifying means to notify an engine operator of a failure of the air-flow control valve when the determining means determines that the air-flow control valve is not made opened.

25. An air-flow control device according to claim 24, wherein the notifying means comprises an alarm lamp.

26. An air-flow control device according to claim 1, the apparatus further comprising a first diaphragm which defines the first vacuum chamber, a displacement of the first diaphragm becoming larger as the negative pressure in the first vacuum chamber becomes larger; a second diaphragm which defines the second vacuum chamber, a displacement of the second diaphragm becoming larger as the negative pressure in the second vacuum chamber becomes larger, the first and the second diaphragms being arranged substantially parallel to each other; an axially movable rod connecting the first and the second diaphragms to the air-flow control valve, the rod extending substantially perpendicular to surfaces of the first and the diaphragms; and return springs for respectively biasing the first and the second diaphragms so that displacements of the first and the second diaphragms are reduced, wherein the rod is connected to the air-flow control valve so that the degree of opening of the air-flow control valve becomes larger as the axial displacement of the rod becomes larger, and wherein the first and the second vacuum chambers are arranged so that displacement directions of the first and the second diaphragms are substantially the same, to thereby make the degree of opening of the air-flow control valve larger as the negative pressure in the first and the second vacuum chambers becomes larger.

27. An air-flow control device according to claim 1, the engine further having a surge tank in the intake passage on the upstream of the fuel injector, wherein the air-flow control valve is arranged in the intake passage between the fuel injector and the surge tank.

28. An air-flow control device according to claim 1, the engine further having a starting motor, wherein the engine starting operation is from when the starting motor is operated until the engine speed exceeds a predetermined speed.

29. An air-flow control device according to claim 1, wherein the first vacuum control valve is a solenoid valve, and connects the first vacuum chamber to the atmosphere when the power is supplied thereto and connects the first vacuum chamber to the first vacuum source when the power supply thereto is stopped.

30. An air-flow control device according to claim 1, wherein the second vacuum control valve is a solenoid valve, and it connects the second vacuum chamber to the second vacuum source when the power is supplied thereto and connects the second vacuum chamber to the atmosphere when the power supply thereto is stopped.

31. Am air-flow control device according to claim 1, wherein the air-flow control valve is a butterfly valve.

* * * * *

UNITED STATES PATENT AND TRADEMARK OFFICE
CERTIFICATE OF CORRECTION

PATENT NO. : 5,542,388
DATED : August 6, 1996
INVENTOR(S) : Hiroki ICHINOSE, et al.

It is certified that error appears in the above-indentified patent and that said Letters Patent is hereby corrected as shown below:

Column 1, line 10, change "Publication No," to --Publication No.--.

Column 2, line 34, after "4C" insert --are--.

Column 2, line 35, before "throttle" insert --the--.

Column 3, line 21, change "(not shown.)." to --(not shown).--.

Column 3, line 28, insert a period after "50".

Column 4, line 31, change "D5" to --55--.

Column 4, line 48, change "53" to --23--.

Column 5, line 12, after "from" insert --when--.

Column 5, line 32, insert a comma after "20".

Column 5, line 40, change "improve" to --improved--.

Column 5, line 47, change "improve" to --improved--.

Column 8, line 23, after "from" insert --when--.

Column 8, line 27, change "B2" to --82--.

UNITED STATES PATENT AND TRADEMARK OFFICE
CERTIFICATE OF CORRECTION

PATENT NO. : 5,542,388
DATED : August 6, 1996
INVENTOR(S) : Hiroki ICHINOSE, et al.

It is certified that error appears in the above-indentified patent and that said Letters Patent is hereby corrected as shown below:

Column 9, line 5, change "nd" to --and--.

Column 10, line 33, insert --to-- before "step".

Column 10, line 37, delete the period after "atmosphere" and change "When" to --then--.

Column 12, line 3, change "controm" to --control--.

Column 12, line 7, change "air-assists" to --air-assist--.

Column 12, line 33, change "115" to --116--.

Column 12, line 42, change "vale" to --valve--.

Column 12, line 50, change "etep" to --step--.

Column 12, line 66, delete the semi-colon after "into".

Column 13, line 53, change "above mentioned" to --above-mentioned--.

Column 14, line 36, change "Judged" to --judged--.

Column 15, line 18, change "Q/N <(Q/" to --Q/N<(Q/--.

Column 16, line 6, change "10 b" to --10b--.

UNITED STATES PATENT AND TRADEMARK OFFICE
CERTIFICATE OF CORRECTION

PATENT NO. : 5,542,388
DATED : August 6, 1996
INVENTOR(S) : Hiroki ICHINOSE, et al.

It is certified that error appears in the above-indentified patent and that said Letters Patent is hereby corrected as shown below:

Column 17, line 25, after "thereby" insert --make-- and delete "is" at end of line.

Column 17, line 26, delete "made" at beginning of line.

Column 17, line 40, change "introduced" to --introduces--.

Column 18, line 24, after "regardless" insert --of--.

Column 18, line 57, change "contusion" to --condition--.

Column 18, line 63, after "17," insert --wherein--.

Column 19, line 32, insert --second-- before "diaphragms".

Signed and Sealed this

Thirteenth Day of May, 1997

Attest:

BRUCE LEHMAN

Attesting Officer

Commissioner of Patents and Trademarks